US012628810B2

(12) United States Patent
Conrad et al.

(10) Patent No.: US 12,628,810 B2
(45) Date of Patent: May 19, 2026

(54) PLANT TREATMENT MODEL SELECTION BASED ON AGRICULTURAL IMAGE INTERACTION

(71) Applicant: Deere & Company, Moline, IL (US)

(72) Inventors: Swen Ulrich Conrad, Mountain View, CA (US); Anthony John Latham, Ankeny, IA (US)

(73) Assignee: Deere & Company, Moline, IL (US)

( * ) Notice: Subject to any disclaimer, the term of this patent is extended or adjusted under 35 U.S.C. 154(b) by 236 days.

(21) Appl. No.: 18/344,582

(22) Filed: Jun. 29, 2023

(65) Prior Publication Data

US 2025/0000078 A1 Jan. 2, 2025

(51) Int. Cl.
A01M 7/00 (2006.01)
G06V 20/10 (2022.01)
(52) U.S. Cl.
CPC ......... *A01M 7/0089* (2013.01); *G06V 20/188* (2022.01)
(58) Field of Classification Search
CPC .... A01M 7/0089; G06V 20/188; G06Q 50/02
USPC ....................................................... 382/110
See application file for complete search history.

(56) References Cited

U.S. PATENT DOCUMENTS

| | | |
|---|---|---|
| 11,580,718 B2 | 2/2023 | Padwick et al. |
| 2017/0161560 A1 | 6/2017 | Itzhaky et al. |
| 2018/0330166 A1 | 11/2018 | Redden et al. |

| | | | |
|---|---|---|---|
| 2020/0184128 A1 | 6/2020 | Hu et al. | |
| 2021/0056338 A1* | 2/2021 | Padwick ................... | G06T 7/11 |
| 2021/0153500 A1 | 5/2021 | Kuenzi | |
| 2021/0224927 A1 | 7/2021 | Perry et al. | |

(Continued)

FOREIGN PATENT DOCUMENTS

| | | |
|---|---|---|
| AU | 2022246430 A1 | 5/2023 |
| WO | WO 2022079172 A1 | 4/2022 |

(Continued)

OTHER PUBLICATIONS

Extended European Search Report and Written Opinion issued in European Patent Application No. 24184128.7 dated Dec. 9, 2024, in 08 pages.

(Continued)

*Primary Examiner* — Jennifer Mehmood
*Assistant Examiner* — Dustin Bilodeau
(74) *Attorney, Agent, or Firm* — Fenwick & West LLP

(57) ABSTRACT

Embodiments relate to selecting and utilizing a plant treatment model. A control system may provide images of plants of different dimensions and types for display to a user. The control system may generate one or more plant treatment action preferences of the user based on user interactions with the provided images of plants. The control system may apply trained plant treatment models to the images of plants, each plant treatment model identifying one or more plants in the images and one or more corresponding plant treatment actions. The control system may select a plant treatment model based on a comparison of (1) plants and corresponding plant treatment actions identified by the plant treatment models in the images and (2) the one or more plant treatment action preferences of the user. The control system may configure a farming machine to operate based on the selected plant treatment model.

23 Claims, 11 Drawing Sheets

(56)  References Cited

U.S. PATENT DOCUMENTS

| | | | |
|---|---|---|---|
| 2022/0092705 A1 | 3/2022 | Khait et al. | |
| 2022/0183208 A1* | 6/2022 | Sibley | A01B 69/001 |
| 2022/0338421 A1 | 10/2022 | Call et al. | |
| 2023/0306795 A1* | 9/2023 | Lechner | G07C 5/008 |
| 2024/0172600 A1* | 5/2024 | Xu | A01G 7/06 |

FOREIGN PATENT DOCUMENTS

| | | |
|---|---|---|
| WO | WO 2022232783 A1 | 11/2022 |
| WO | WO 2023288068 A1 | 1/2023 |
| WO | WO 2023118551 A1 | 6/2023 |

OTHER PUBLICATIONS

Extended European Search Report and Written Opinion issued in European Patent Application No. 24184130.3 dated Nov. 11, 2024, in 07 pages.

* cited by examiner

FIG. 4B

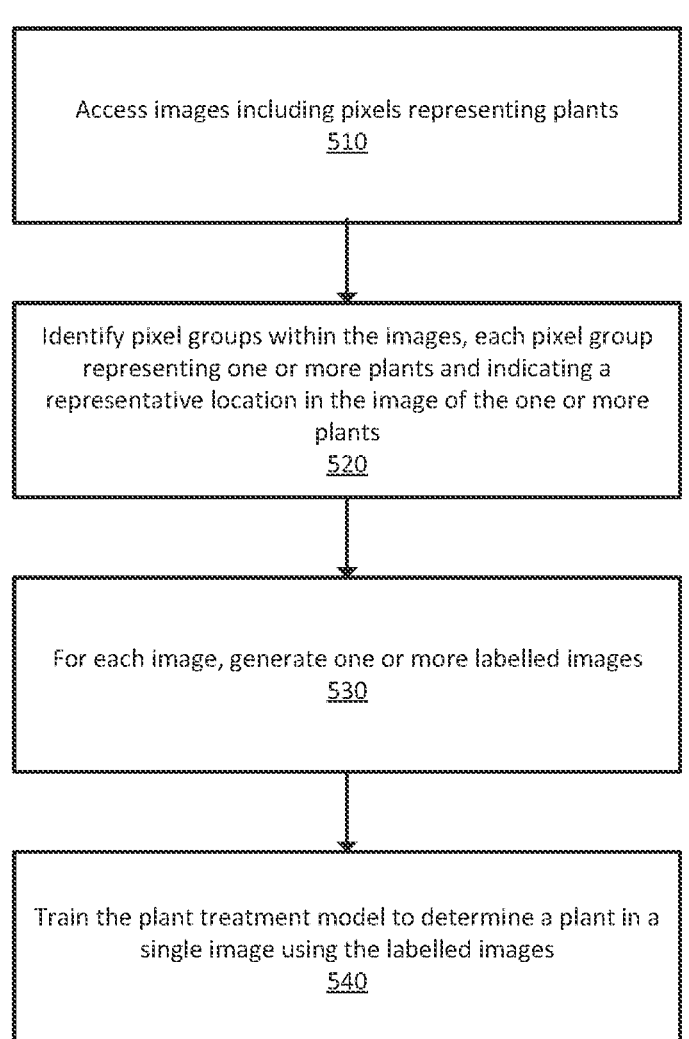

500

Access images including pixels representing plants
510

Identify pixel groups within the images, each pixel group representing one or more plants and indicating a representative location in the image of the one or more plants
520

For each image, generate one or more labelled images
530

Train the plant treatment model to determine a plant in a single image using the labelled images
540

FIG. 5

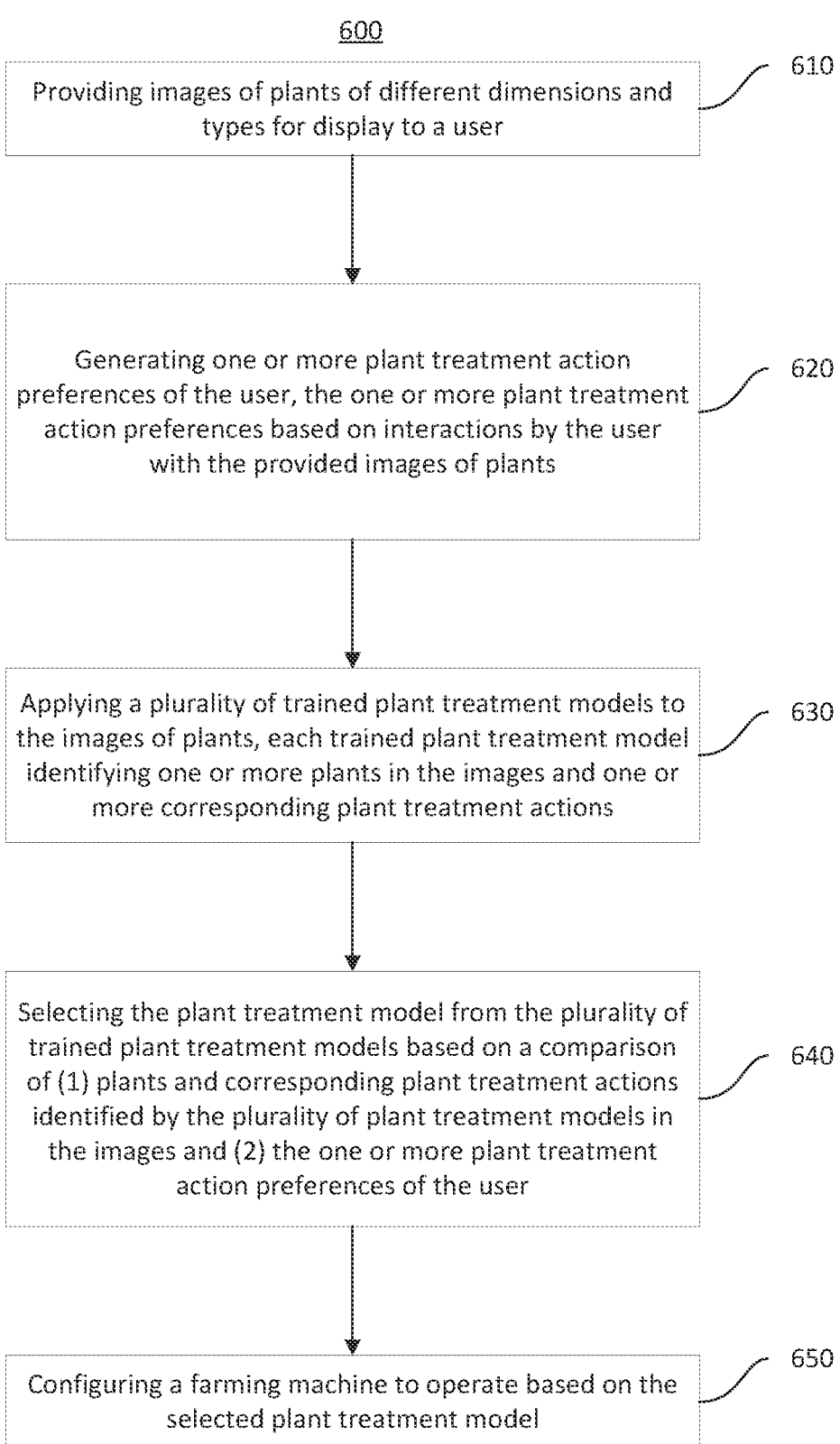

600

Providing images of plants of different dimensions and types for display to a user — 610

Generating one or more plant treatment action preferences of the user, the one or more plant treatment action preferences based on interactions by the user with the provided images of plants — 620

Applying a plurality of trained plant treatment models to the images of plants, each trained plant treatment model identifying one or more plants in the images and one or more corresponding plant treatment actions — 630

Selecting the plant treatment model from the plurality of trained plant treatment models based on a comparison of (1) plants and corresponding plant treatment actions identified by the plurality of plant treatment models in the images and (2) the one or more plant treatment action preferences of the user — 640

Configuring a farming machine to operate based on the selected plant treatment model — 650

FIG. 6

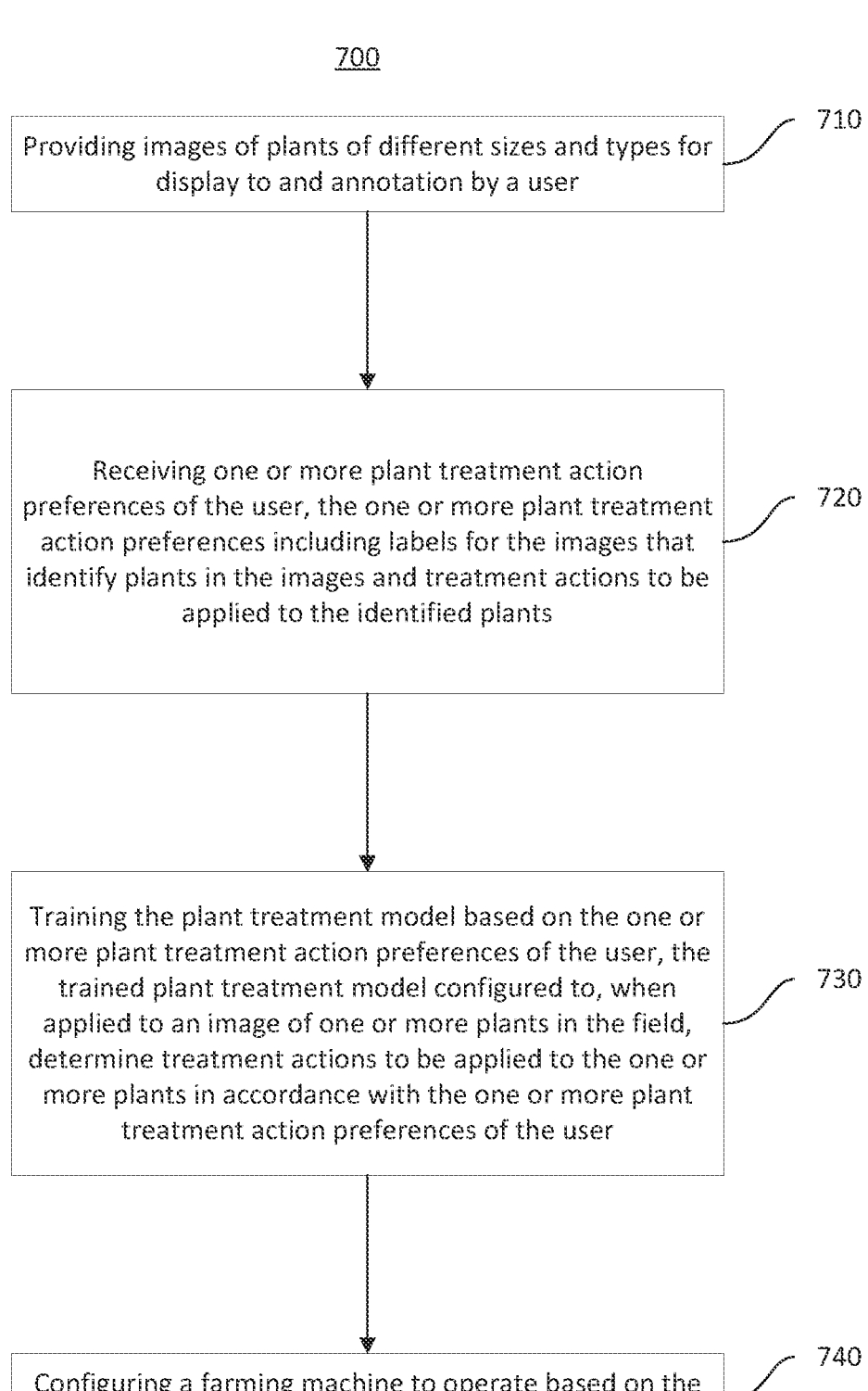

700

Providing images of plants of different sizes and types for display to and annotation by a user — 710

Receiving one or more plant treatment action preferences of the user, the one or more plant treatment action preferences including labels for the images that identify plants in the images and treatment actions to be applied to the identified plants — 720

Training the plant treatment model based on the one or more plant treatment action preferences of the user, the trained plant treatment model configured to, when applied to an image of one or more plants in the field, determine treatment actions to be applied to the one or more plants in accordance with the one or more plant treatment action preferences of the user — 730

Configuring a farming machine to operate based on the trained plant treatment model — 740

FIG. 7

PLANT TREATMENT MODEL SELECTION BASED ON AGRICULTURAL IMAGE INTERACTION

BACKGROUND

Field of Disclosure

This disclosure relates to plant treatment models used to treat plants, and more specifically, to selecting, training, and utilizing plant treatment models according to plant treatment action preferences of one or more users.

Description of Related Art

It is difficult to apply treatments to individual plants in a field rather than large areas of the field. To treat plants individually farmers can, for example, manually apply treatment to plants, but this proves labor-intensive and costly when performed at industrial scale.

SUMMARY

A user (e.g., an agricultural manager) can have a variety of different preferences for performing plant treatment actions in a field depending on, for example, conditions of plants in the field, weather conditions, and economic considerations. For example, in some situations a user may desire to treat each individual crop plant and each individual weed plant in a field. However, in other situations, the user may be interested in treating weeds larger than a size threshold but not interested in treating weeds smaller than that. In another example, a user may be interested in treating weeds that are hard to control but not interested in treating the other weeds. Furthermore, a user's preferences may change throughout a season (e.g., early, mid, and late season treatment passes follow different priorities). For example, a famer with a large amount of treatment resources during the early season may desire to treat a large number of crop and weed plants in the field. However, in the late season, if the user only has a small amount of treatment resources remaining, the user may desire to treat only a small number of crop and weed plants in the field.

To account for the varied and changing preferences of users, this disclosure relates to selecting, training, and utilizing plant treatment models according to plant treatment action preferences of a user. Among other advantages, some embodiments enable customized plant treatment models or treatment plans for users that result in the desired weed control or resource savings (e.g., fewer treatment resources are needed to achieve the desired weed control).

Some embodiments relate to a method for selecting and utilizing a plant treatment model. The method includes: providing images of plants of different dimensions and types for display to a user; generating one or more plant treatment action preferences of the user for a farming machine configured to perform treatment actions on plants growing in a field, the one or more plant treatment action preferences based on interactions by the user with the provided images of plants; applying a plurality of trained plant treatment models to the images of plants, each trained plant treatment model identifying one or more plants in the images and one or more corresponding plant treatment actions; selecting the plant treatment model from the plurality of trained plant treatment models based on a comparison of (1) plants and corresponding plant treatment actions identified by the plurality of plant treatment models in the images and (2) the one or more plant treatment action preferences of the user; and configuring the farming machine to operate based on the selected plant treatment model.

Some embodiments relate to a method for training a plant treatment model. The method includes: providing images of plants of different sizes and types for display to and annotation by a user; receiving one or more plant treatment action preferences of the user for a farming machine configured to perform treatment actions on plants growing in a field, the one or more plant treatment action preferences including labels for the images that identify plants in the images and treatment actions to be applied to the identified plants; training the plant treatment model based on the one or more plant treatment action preferences of the user, the trained plant treatment model configured to, when applied to an image of one or more plants in the field, determine treatment actions to be applied to the one or more plants in accordance with the one or more plant treatment action preferences of the user; and configuring the farming machine to operate based on the trained plant treatment model.

Other aspects include components, devices, systems, improvements, methods, processes, applications, computer readable mediums, and other technologies related to any of the above.

BRIEF DESCRIPTION OF DRAWINGS

FIG. 4B a conceptual flowchart for a user interface presenting images to a user, in accordance with one or more example embodiments.

FIG. 5 is a flowchart of an example method for training a plant treatment model, in accordance with one or more embodiments.

FIG. 6 is a flowchart of an example method for selecting and utilizing a plant treatment model, in accordance with one or more embodiments.

FIG. 7 is a flowchart of an example method for training a plant treatment model, in accordance with one or more embodiments.

Figure 1A:
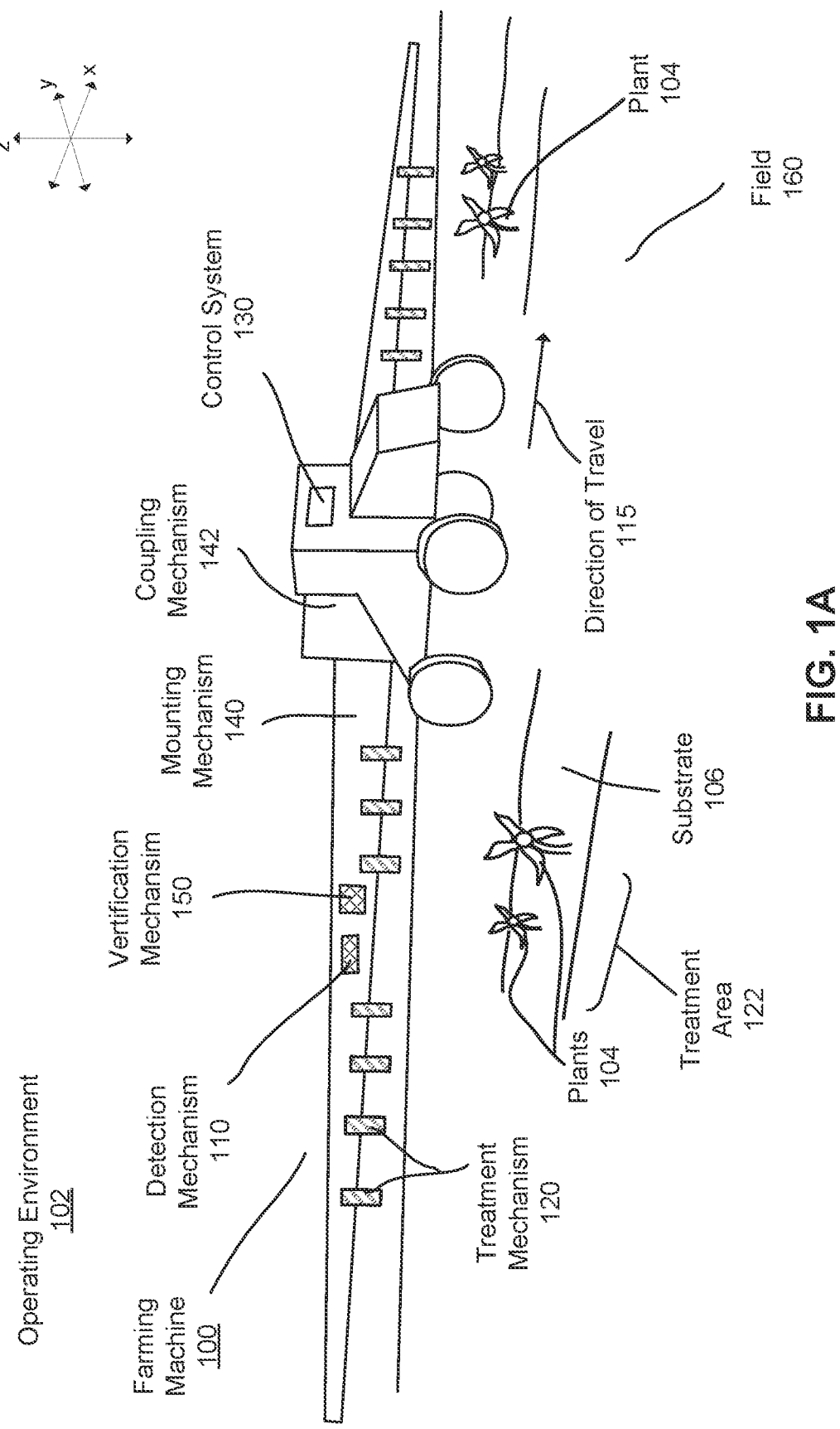
FIG. 1A illustrates an isometric view of a farming machine, in accordance with a first example embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

I. Introduction

Embodiments relate to selecting, training, and utilizing plant treatment models according to plant treatment action preferences of one or more users. A farming machine may be configured to operate based on a plant treatment model. FIGS. 1-2 describe general information related to example farming machines.

II. Field Management and Treatment Plans

Field Management

Agricultural managers ("managers") are responsible for managing farming operations in one or more fields. Managers work to implement a farming objective within those fields and select from among a variety of farming actions to implement that farming objective. Traditionally, managers are, for example, a farmer or agronomist that works the field but could also be other people and/or systems configured to manage farming operations within the field. For example, a manager could be an automated farming machine, a machine learned computer model, etc. In some cases, a manager may be a combination of the managers described above. For example, a manager may include a farmer assisted by a machine learned agronomy model and one or more automated farming machines or could be a farmer and an agronomist working in tandem.

Managers implement one or more farming objectives for a field. A farming objective is typically a macro-level goal for a field. For example, macro-level farming objectives may include treating crops with growth promotors, neutralizing weeds with growth regulators, harvesting a crop with the best possible crop yield, or any other suitable farming objective. However, farming objectives may also be a micro-level goal for the field. For example, micro-level farming objectives may include treating a particular plant in the field, repairing or correcting a part of a farming machine, requesting feedback from a manager, etc. Of course, there are many possible farming objectives and combinations of farming objectives, and the previously described examples are not intended to be limiting.

Faming objectives are accomplished by one or more farming machines performing a series of farming actions. Farming machines are described in greater detail below. Farming actions are any operation implementable by a farming machine within the field that works towards a farming objective. Consider, for example, a farming objective of harvesting a crop with the best possible yield. This farming objective requires a litany of farming actions, e.g., planting the field, fertilizing the plants 104, watering the plants 104, weeding the field, harvesting the plants 104, evaluating yield, etc. Similarly, each farming action pertaining to harvesting the crop may be a farming objective in and of itself. For instance, planting the field can require its own set of farming actions, e.g., preparing the soil, digging in the soil, planting a seed, etc.

In other words, managers implement a treatment plan in the field to accomplish a farming objective. A treatment plan is a hierarchical set of macro-level and/or micro-level objectives that accomplish the farming objective of the manager. Within a treatment plan, each macro or micro-objective may require a set of farming actions to accomplish, or each macro or micro-objective may be a farming action itself. So, to expand, the treatment plan is a temporally sequenced set of farming actions to apply to the field that the manager expects will accomplish the faming objective.

When executing a treatment plan in a field, the treatment plan itself and/or its constituent farming objectives and farming actions have various results. A result is a representation as to whether, or how well, a farming machine accomplished the treatment plan, farming objective, and/or farming action. A result may be a qualitative measure such as "accomplished" or "not accomplished," or may be a quantitative measure such as "40 pounds harvested," or "1.25 acres treated." Results can also be positive or negative, depending on the configuration of the farming machine or the implementation of the treatment plan. Moreover, results can be measured by sensors of the farming machine, input by managers, or accessed from a datastore or a network.

Traditionally, managers have leveraged their experience, expertise, and technical knowledge when implementing farming actions in a treatment plan. In a first example, a manager may spot check weed pressure in several areas of the field to determine when a field is ready for weeding. In a second example, a manager may refer to previous implementations of a treatment plan to determine the best time to begin planting a field. Finally, in a third example, a manager may rely on established best practices in determining a specific set of farming actions to perform in a treatment plan to accomplish a farming objective.

Leveraging manager and historical knowledge to make decisions for a treatment plan affects both spatial and temporal characteristics of a treatment plan. For instance, farming actions in a treatment plan have historically been applied to entire field rather than small portions of a field. To illustrate, when a manager decides to plant a crop, she plants the entire field instead of just a corner of the field having the best planting conditions; or, when the manager decides to weed a field, she weeds the entire field rather than just a few rows. Similarly, each farming action in the sequence of farming actions of a treatment plan are historically performed at approximately the same time. For example, when a manager decides to fertilize a field, she fertilizes the field at approximately the same time; or, when the manager decides to harvest the field, she does so at approximately the same time.

Notably though, farming machines have greatly advanced in their capabilities. For example, farming machines continue to become more autonomous, include an increasing number of sensors and measurement devices, employ higher amounts of processing power and connectivity, and implement various machine vision algorithms to enable managers to successfully implement a treatment plan.

Because of this increase in capability, managers are no longer limited to spatially and temporally monolithic implementations of farming actions in a treatment plan. Instead, managers may leverage advanced capabilities of farming machines to implement treatment plans that are highly localized and determined by real-time measurements in the field. In other words, rather than a manager applying a "best guess" treatment plan to an entire field, they can implement individualized and informed treatment plans for each plant in the field.

III. Farming Machine

Overview

A farming machine that implements farming actions of a treatment plan may have a variety of configurations, some of which are described in greater detail below.

Figure 1B:
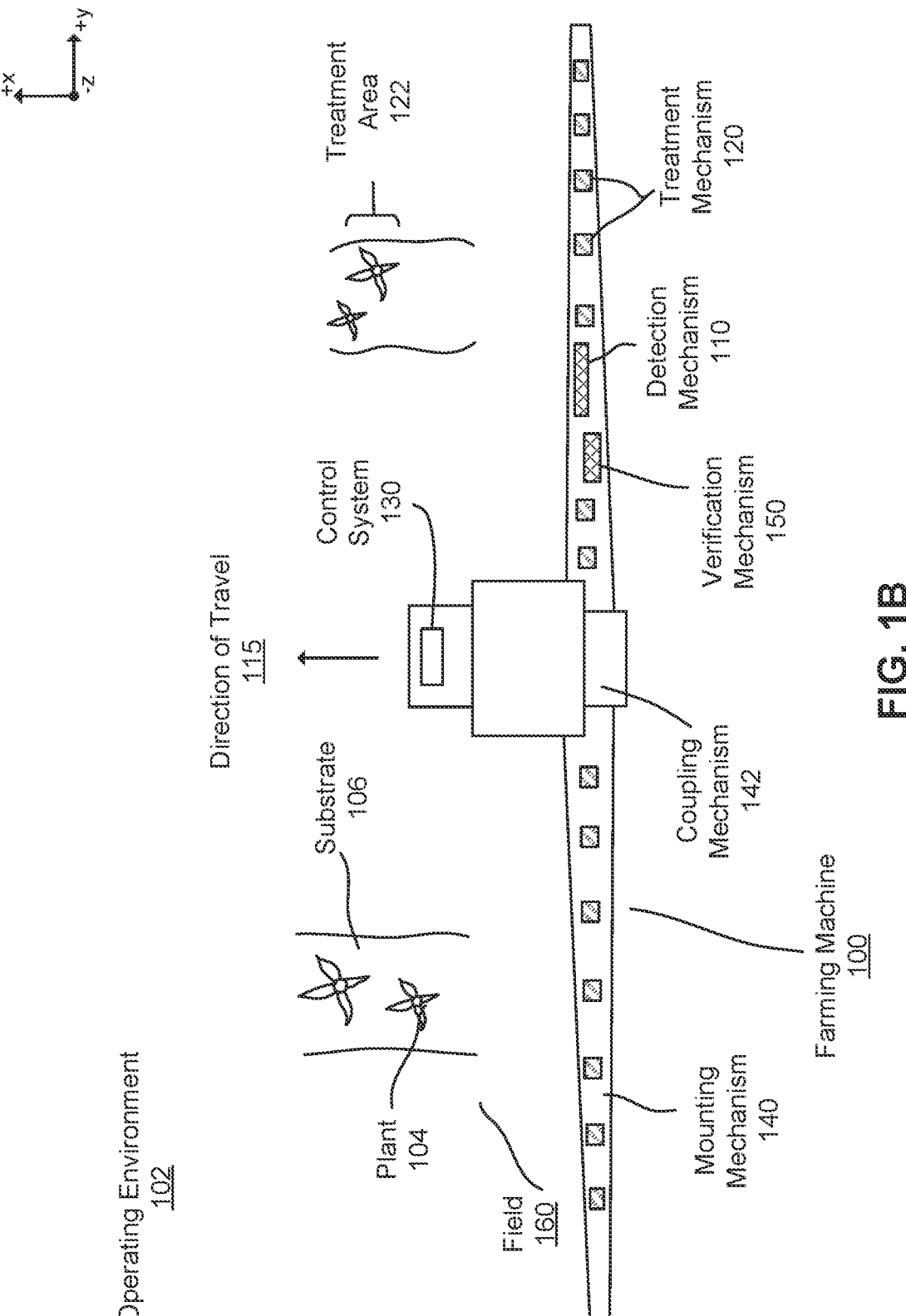
FIG. 1B illustrates a top view of a farming machine, in accordance with the first embodiment.
Figure 1C:
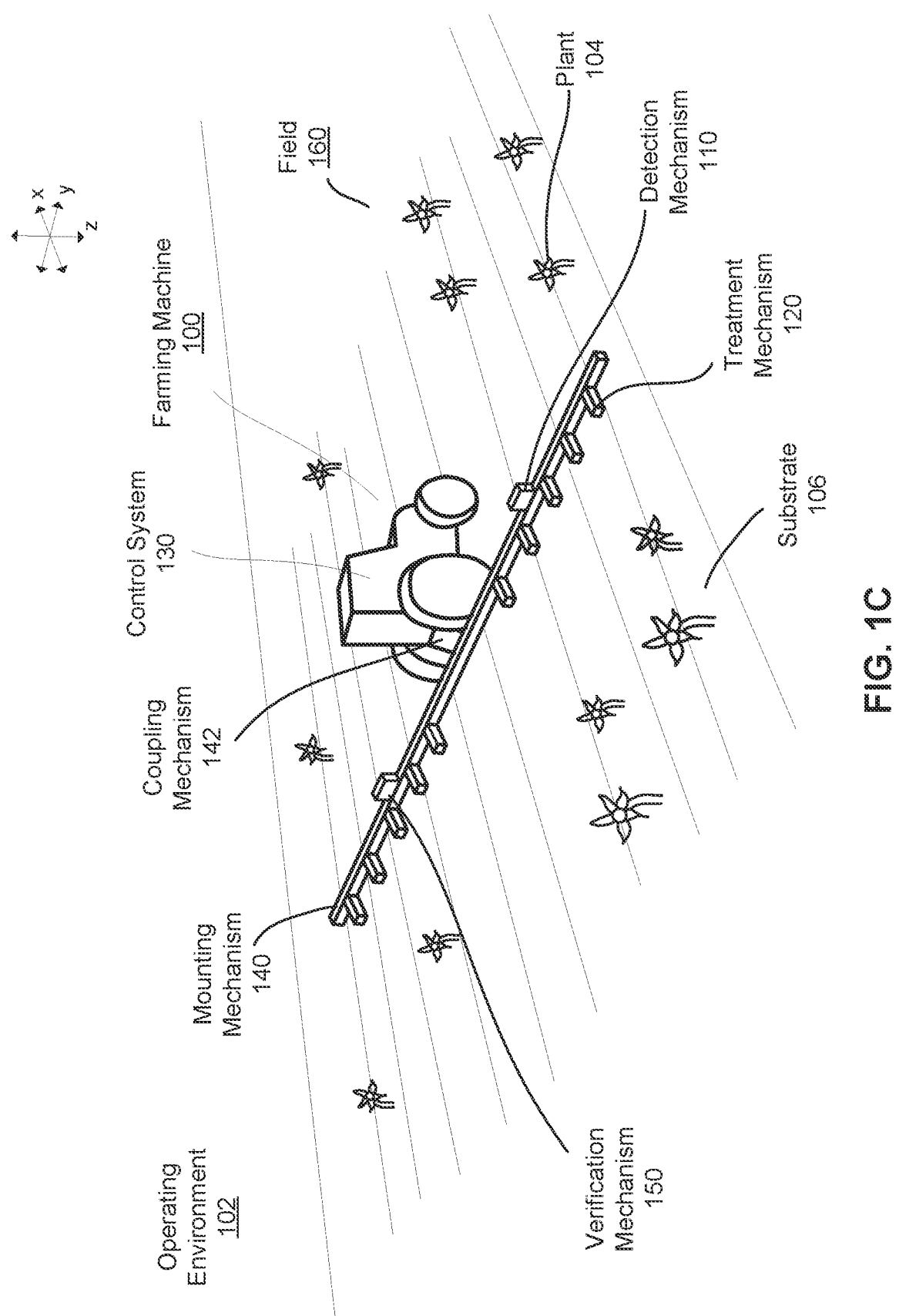
FIG. 1C illustrates an isometric view of a farming machine, in accordance with a second example embodiment.
Figure 2:
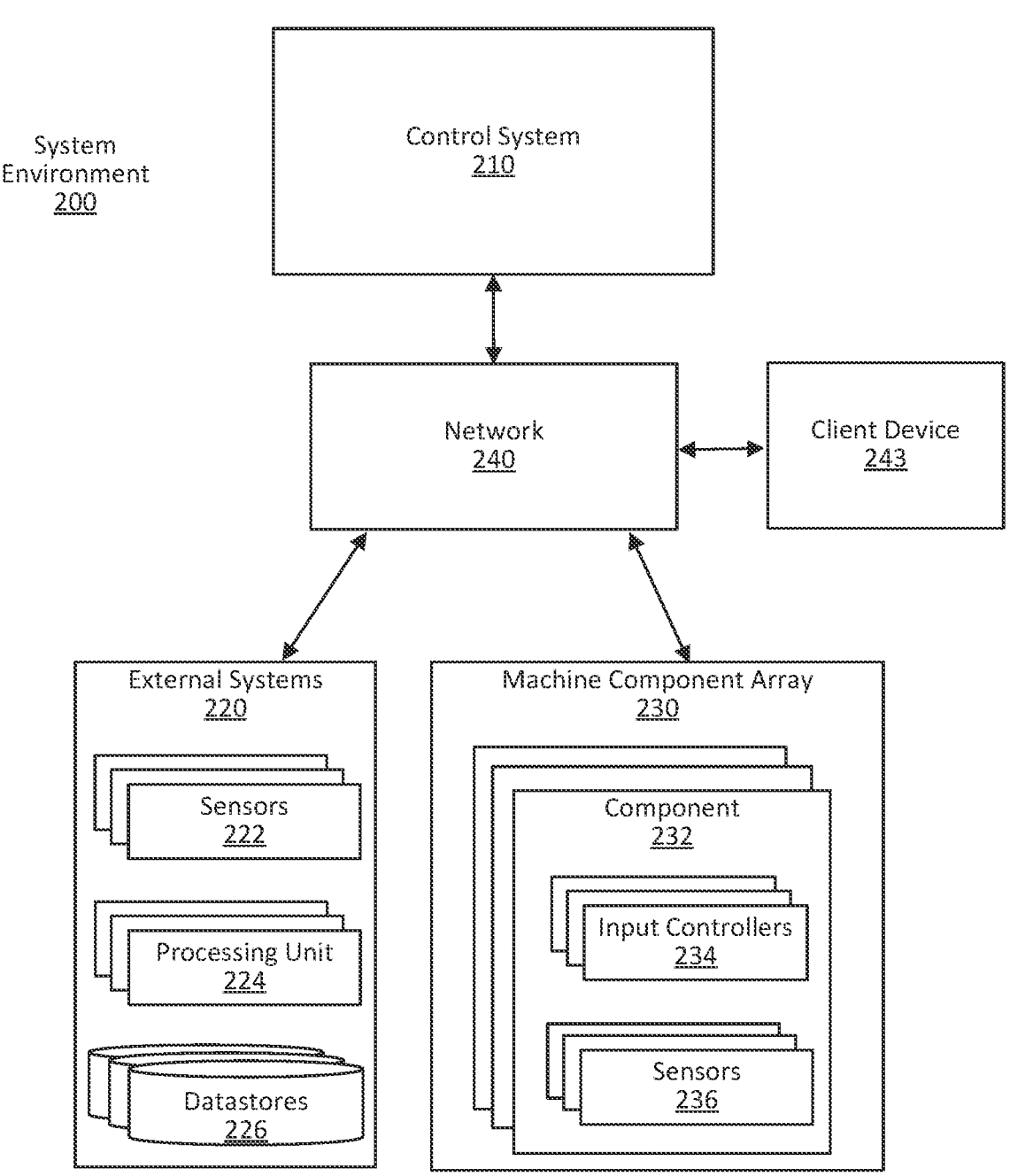
FIG. 2 is a block diagram of the system environment for the farming machine, in accordance with one or more example embodiments.

FIG. 1A is an isometric view of a farming machine 100 that performs farming actions of a treatment plan, according to one example embodiment, and FIG. 1B is a top view of the farming machine 100 in FIG. 1A. FIG. 1C is an isometric view of another farming machine 100 that performs farming actions of a treatment plan, in accordance with one example embodiment.

The farming machine 100 includes a detection mechanism 110, a treatment mechanism 120, and a control system 130. The farming machine 100 can additionally include a mounting mechanism 140, a verification mechanism 150, a power source, digital memory, communication apparatus, or any other suitable component that enables the farming machine 100 to implement farming actions in a treatment plan. Moreover, the described components and functions of the farming machine 100 are just examples, and a farming machine 100 can have different or additional components and functions other than those described below.

The farming machine 100 is configured to perform farming actions in a field 160, and the implemented farming actions are part of a treatment plan. To illustrate, the farming machine 100 implements a farming action which applies a treatment to one or more plants 104 and/or the substrate 106 within a geographic area. Here, the treatment farming actions are included in a treatment plan to regulate plant growth. As such, treatments are typically applied directly to a single plant 104, but can alternatively be directly applied to multiple plants 104, indirectly applied to one or more plants 104, applied to the environment 102 associated with the plant 104 (e.g., soil, atmosphere, or other suitable portion of the plant's environment adjacent to or connected by an environmental factors, such as wind), or otherwise applied to the plants 104.

In a particular example, the farming machine 100 is configured to implement a farming action which applies a treatment that necroses the entire plant 104 (e.g., weeding) or part of the plant 104 (e.g., pruning). In this case, the farming action can include dislodging the plant 104 from the supporting substrate 106, incinerating a portion of the plant 104 (e.g., with directed electromagnetic energy such as a laser), applying a treatment concentration of working fluid (e.g., fertilizer, hormone, water, etc.) to the plant 104, or treating the plant 104 in any other suitable manner.

In another example, the farming machine 100 is configured to implement a farming action which applies a treatment to regulate plant growth. Regulating plant growth can include promoting plant growth, promoting growth of a plant portion, hindering (e.g., retarding) plant 104 or plant portion growth, or otherwise controlling plant growth. Examples of regulating plant growth includes applying growth hormone to the plant 104, applying fertilizer to the plant 104 or substrate 106, applying a disease treatment or insect treatment to the plant 104, electrically stimulating the plant 104, watering the plant 104, pruning the plant 104, or otherwise treating the plant 104. Plant growth can additionally be regulated by pruning, necrosing, or otherwise treating the plants 104 adjacent to the plant 104.

Operating Environment 102

The farming machine 100 operates in an operating environment 102. The operating environment 102 is the environment 102 surrounding the farming machine 100 while it implements farming actions of a treatment plan. The operating environment 102 may also include the farming machine 100 and its corresponding components itself.

The operating environment 102 typically includes a field 160, and the farming machine 100 generally implements farming actions of the treatment plan in the field 160. A field 160 is a geographic area where the farming machine 100 implements a treatment plan. The field 160 may be an outdoor plant field but could also be an indoor location that houses plants such as, e.g., a greenhouse, a laboratory, a grow house, a set of containers, or any other suitable environment 102.

A field 160 may include any number of field portions. A field portion is a subunit of a field 160. For example, a field portion may be a portion of the field 160 small enough to include a single plant 104, large enough to include many plants 104, or some other size. The farming machine 100 can execute different farming actions for different field portions. For example, the farming machine 100 may apply an herbicide for some field portions in the field 160, while applying a pesticide in another field portion. Moreover, a field 160 and a field portion are largely interchangeable in the context of the methods and systems described herein. That is, treatment plans and their corresponding farming actions may be applied to an entire field 160 or a field portion depending on the circumstances at play.

The operating environment 102 may also include plants 104. As such, farming actions the farming machine 100 implements as part of a treatment plan may be applied to plants 104 in the field 160. The plants 104 can be crops but could also be weeds or any other suitable plant 104. Some example crops include cotton, lettuce, soybeans, rice, carrots, tomatoes, corn, broccoli, cabbage, potatoes, wheat, or any other suitable commercial crop. The weeds may be grasses, broadleaf weeds, thistles, or any other suitable determinantal weed.

More generally, plants 104 may include a stem that is arranged superior to (e.g., above) the substrate 106 and a root system joined to the stem that is located inferior to the plane of the substrate 106 (e.g., below ground). The stem may support any branches, leaves, and/or fruits. The plant 104 can have a single stem, leaf, or fruit, multiple stems, leaves, or fruits, or any number of stems, leaves or fruits. The root system may be a tap root system or fibrous root system, and the root system may support the plant 104 position and absorb nutrients and water from the substrate 106. In various examples, the plant 104 may be a vascular plant 104, non-vascular plant 104, ligneous plant 104, herbaceous plant 104, or be any suitable type of plant 104.

Plants 104 in a field 160 may be grown in one or more plant 104 rows (e.g., plant 104 beds). The plant 104 rows are typically parallel to one another but do not have to be. Each plant 104 row is generally spaced between 2 inches and 45 inches apart when measured in a perpendicular direction from an axis representing the plant 104 row. Plant 104 rows can have wider or narrower spacings or could have variable spacing between multiple rows (e.g., a spacing of 12 in. between a first and a second row, a spacing of 16 in. a second and a third row, etc.).

Plants 104 within a field 160 may include the same type of crop (e.g., same genus, same species, etc.). For example, each field portion in a field 160 may include corn crops. However, the plants 104 within each field 160 may also include multiple crops (e.g., a first, a second crop, etc.). For example, some field portions may include lettuce crops while other field portions include pig weeds, or, in another example, some field portions may include beans while other field portions include corn. Additionally, a single field portion may include different types of crop. For example, a single field portion may include a soybean plant 104 and a grass weed.

The operating environment 102 may also include a substrate 106. As such, farming actions the farming machine 100 implements as part of a treatment plan may be applied to the substrate 106. The substrate 106 may be soil but can alternatively be a sponge or any other suitable substrate 106. The substrate 106 may include plants 104 or may not include plants 104 depending on its location in the field 160. For example, a portion of the substrate 106 may include a row of crops, while another portion of the substrate 106 between crop rows includes no plants 104.

III.A Example Machine Configurations

Detection Mechanism(s)

The farming machine 100 may include a detection mechanism 110. The detection mechanism 110 identifies objects in the operating environment 102 of the farming machine 100. To do so, the detection mechanism 110 obtains information describing the environment 102 (e.g., sensor or image data), and processes that information to identify pertinent objects (e.g., plants 104, substrate 106, persons, etc.) in the operating environment 102. Identifying objects in the environment 102 further enables the farming machine 100 to implement farming actions in the field 160. For example, the detection mechanism 110 may capture an image of the field 160 and process the image with a plant treatment model that identifies plants 104 in the captured image. A plant treatment model may also determine farming actions to implement. The farming machine 100 then implements farming actions in the field 160 based on the output of the plant treatment model.

The farming machine 100 can include any number or type of detection mechanism 110 that may aid in determining and implementing farming actions. In some embodiments, the detection mechanism 110 includes one or more sensors. For example, the detection mechanism 110 can include a multispectral camera, a stereo camera, a CCD camera, a single lens camera, a CMOS camera, hyperspectral imaging system, LIDAR system (light detection and ranging system), a depth sensing system, dynamometer, IR camera, thermal camera, humidity sensor, light sensor, temperature sensor, or any other suitable sensor. Further, the detection mechanism 110 may include an array of sensors (e.g., an array of cameras) configured to capture information about the environment 102 surrounding the farming machine 100. For example, the detection mechanism 110 may include an array of cameras configured to capture an array of pictures representing the environment 102 surrounding the farming machine 100. The detection mechanism 110 may also be a sensor that measures a state of the farming machine 100. For example, the detection mechanism 110 may be a speed sensor, a heat sensor, or some other sensor that can monitor the state of a component of the farming machine 100. Additionally, the detection mechanism 110 may also be a sensor that measures components during implementation of a farming action. For example, the detection mechanism 110 may be a flow rate monitor, a grain harvesting sensor, a mechanical stress sensor etc. Whatever the case, the detection mechanism 110 senses information about the operating environment 102 (including the farming machine 100).

A detection mechanism 110 may be mounted at any point on the mounting mechanism 140. Depending on where the detection mechanism 110 is mounted relative to the treatment mechanism 120, one or the other may pass over a geographic area in the field 160 before the other. For example, the detection mechanism 110 may be positioned on the mounting mechanism 140 such that it traverses over a geographic location before the treatment mechanism 120 as the farming machine 100 moves through the field 160. In another examples, the detection mechanism 110 is positioned to the mounting mechanism 140 such that the two traverse over a geographic location at substantially the same time as the farming machine 100 moves through the filed. Similarly, the detection mechanism 110 may be positioned on the mounting mechanism 140 such that the treatment mechanism 120 traverses over a geographic location before the detection mechanism 110 as the farming machine 100 moves through the field 160. The detection mechanism 110 may be statically mounted to the mounting mechanism 140, or may be removably or dynamically coupled to the mounting mechanism 140. In other examples, the detection mechanism 110 may be mounted to some other surface of the farming machine 100 or may be incorporated into another component of the farming machine 100.

Verification Mechanism(s)

The farming machine 100 may include a verification mechanism 150. Generally, the verification mechanism 150 records a measurement of the operating environment 102 and the farming machine 100 may use the recorded measurement to verify or determine the extent of an implemented farming action (i.e., a result of the farming action).

To illustrate, consider an example where a farming machine 100 implements a farming action based on a measurement of the operating environment 102 by the detection mechanism 110. The verification mechanism 150 records a measurement of the same geographic area measured by the detection mechanism 110 and where farming machine 100 implemented the determined farming action. The farming machine 100 then processes the recorded measurement to determine the result of the farming action. For example, the verification mechanism 150 may record an image of the geographic region surrounding a plant 104 identified by the detection mechanism 110 and treated by a treatment mechanism 120. The farming machine 100 may apply a treatment detection algorithm to the recorded image to determine the result of the treatment applied to the plant 104.

Information recorded by the verification mechanism 150 can also be used to empirically determine operation parameters of the farming machine 100 that will obtain the desired effects of implemented farming actions (e.g., to calibrate the farming machine 100, to modify treatment plans, etc.). For instance, the farming machine 100 may apply a calibration detection algorithm to a measurement recorded by the farming machine 100. In this case, the farming machine 100 determines whether the actual effects of an implemented farming action are the same as its intended effects. If the effects of the implemented farming action are different than its intended effects, the farming machine 100 may perform a calibration process. The calibration process changes operation parameters of the farming machine 100 such that effects of future implemented farming actions are the same as their intended effects. To illustrate, consider the previous example where the farming machine 100 recorded an image of a treated plant 104. There, the farming machine 100 may apply a calibration algorithm to the recorded image to determine whether the treatment is appropriately calibrated (e.g., at its intended location in the operating environment 102). If the farming machine 100 determines that the farming machine 100 is not calibrated (e.g., the applied treatment is at an incorrect location), the farming machine 100 may calibrate itself such that future treatments are in the correct location. Other example calibrations are also possible.

The verification mechanism 150 can have various configurations. For example, the verification mechanism 150 can be substantially similar (e.g., be the same type of mechanism as) the detection mechanism 110 or can be different from the detection mechanism 110. In some cases, the detection mechanism 110 and the verification mechanism 150 may be one in the same (e.g., the same sensor). In an example configuration, the verification mechanism 150 is positioned distal the detection mechanism 110 relative the direction of travel 115, and the treatment mechanism 120 is positioned there between. In this configuration, the verification mechanism 150 traverses over a geographic location in the operating environment 102 after the treatment mechanism 120 and the detection mechanism 110. However, the mounting mechanism 140 can retain the relative positions of the system components in any other suitable configuration. In some configurations, the verification mechanism 150 can be included in other components of the farming machine 100.

The farming machine 100 can include any number or type of verification mechanism 150. In some embodiments, the verification mechanism 150 includes one or more sensors. For example, the verification mechanism 150 can include a multispectral camera, a stereo camera, a CCD camera, a single lens camera, a CMOS camera, hyperspectral imaging system, LIDAR system (light detection and ranging system), a depth sensing system, dynamometer, IR camera, thermal camera, humidity sensor, light sensor, temperature sensor, or any other suitable sensor. Further, the verification mechanism 150 may include an array of sensors (e.g., an array of cameras) configured to capture information about the environment 102 surrounding the farming machine 100. For example, the verification mechanism 150 may include an array of cameras configured to capture an array of pictures representing the operating environment 102.

Treatment Mechanism(s)

The farming machine 100 may include a treatment mechanism 120. The treatment mechanism 120 can implement farming actions in the operating environment 102 of a farming machine 100. For instance, a farming machine 100 may include a treatment mechanism 120 that applies a treatment to a plant 104, a substrate 106, or some other object in the operating environment 102. More generally, the farming machine 100 employs the treatment mechanism 120 to apply a treatment to a treatment area 122, and the treatment area 122 may include anything within the operating environment 102 (e.g., a plant 104 or the substrate 106). In other words, the treatment area 122 may be any portion of the operating environment 102.

When the treatment is a plant treatment, the treatment mechanism 120 applies a treatment to a plant 104 in the field 160. The treatment mechanism 120 may apply treatments to identified plants or non-identified plants. For example, the farming machine 100 may identify and treat a specific plant (e.g., plant 104) in the field 160. Alternatively, or additionally, the farming machine 100 may identify some other trigger that indicates a plant treatment and the treatment mechanism 120 may apply a plant treatment. Some example plant treatment mechanisms 120 include: one or more spray nozzles, one or more electromagnetic energy sources (e.g., a laser), one or more physical implements configured to manipulate plants, but other plant 104 treatment mechanisms 120 are also possible.

Additionally, when the treatment is a plant treatment, the effect of treating a plant 104 with a treatment mechanism 120 may include any of plant necrosis, plant growth stimulation, plant portion necrosis or removal, plant portion growth stimulation, or any other suitable treatment effect. Moreover, the treatment mechanism 120 can apply a treatment that dislodges a plant 104 from the substrate 106, severs a plant 104 or portion of a plant 104 (e.g., cutting), incinerates a plant 104 or portion of a plant 104, electrically stimulates a plant 104 or portion of a plant 104, fertilizes or promotes growth (e.g., with a growth hormone) of a plant 104, waters a plant 104, applies light or some other radiation to a plant 104, and/or injects one or more working fluids into the substrate 106 adjacent to a plant 104 (e.g., within a threshold distance from the plant). Other plant treatments are also possible. When applying a plant treatment, the treatment mechanisms 120 may be configured to spray one or more of: an herbicide, a fungicide, insecticide, some other pesticide, or water.

When the treatment is a substrate treatment, the treatment mechanism 120 applies a treatment to some portion of the substrate 106 in the field 160. The treatment mechanism 120 may apply treatments to identified areas of the substrate 106, or non-identified areas of the substrate 106. For example, the farming machine 100 may identify and treat an area of substrate 106 in the field 160. Alternatively, or additionally, the farming machine 100 may identify some other trigger that indicates a substrate 106 treatment and the treatment mechanism 120 may apply a treatment to the substrate 106. Some example treatment mechanisms 120 configured for applying treatments to the substrate 106 include: one or more spray nozzles, one or more electromagnetic energy sources, one or more physical implements configured to manipulate the substrate 106, but other substrate 106 treatment mechanisms 120 are also possible.

Of course, the farming machine 100 is not limited to treatment mechanisms 120 for plants 104 and substrates 106. The farming machine 100 may include treatment mechanisms 120 for applying various other treatments to objects in the field 160. Depending on the configuration, the farming machine 100 may include various numbers of treatment mechanisms 120 (e.g., 1, 2, 5, 20, 60, etc.). A treatment mechanism 120 may be fixed (e.g., statically coupled) to the mounting mechanism 140 or attached to the farming machine 100. Alternatively, or additionally, a treatment mechanism 120 may movable (e.g., translatable, rotatable, etc.) on the farming machine 100. In one configuration, the farming machine 100 includes a single treatment mechanism 120. In this case, the treatment mechanism 120 may be actuatable to align the treatment mechanism 120 to a treatment area 122. In a second variation, the farming machine 100 includes a treatment mechanism 120 assembly comprising an array of treatment mechanisms 120. In this configuration, a treatment mechanism 120 may be a single treatment mechanism 120, a combination of treatment mechanisms 120, or the treatment mechanism 120 assembly. Thus, either a single treatment mechanism 120, a combination of treatment mechanisms 120, or the entire assembly may be selected to apply a treatment to a treatment area 122. Similarly, either the single, combination, or entire assembly may be actuated to align with a treatment area, as needed. In some configurations, the farming machine 100 may align a treatment mechanism 120 with an identified object in the operating environment 102. That is, the farming machine 100 may identify an object in the operating environment 102 and actuate the treatment mechanism 120 such that its treatment area aligns with the identified object.

A treatment mechanism 120 may be operable between a standby mode and a treatment mode. In the standby mode the treatment mechanism 120 does not apply a treatment, and in the treatment mode the treatment mechanism 120 is controlled by the control system 130 to apply the treatment. However, the treatment mechanism 120 can be operable in any other suitable number of operation modes.

Control System(s)

The farming machine 100 includes a control system 130. The control system 130 controls operation of the various components and systems on the farming machine 100. For instance, the control system 130 can obtain information about the operating environment 102, processes that information to identify a farming action to implement (e.g., via a plant treatment model), and implement the identified farming action with system components of the farming machine 100.

The control system 130 can receive information from the detection mechanism 110, the verification mechanism 150, the treatment mechanism 120, and/or any other component or system of the farming machine 100. For example, the control system 130 may receive measurements from the detection mechanism 110 or verification mechanism 150, or information relating to the state of a treatment mechanism 120 or implemented farming actions from a verification mechanism 150. Other information is also possible.

Similarly, the control system 130 can provide input to the detection mechanism 110, the verification mechanism 150, and/or the treatment mechanism 120. For instance, the control system 130 may be configured input and control operating parameters of the farming machine 100 (e.g., speed, direction). Similarly, the control system 130 may be configured to input and control operating parameters of the detection mechanism 110 and/or verification mechanism 150. Operating parameters of the detection mechanism 110 and/or verification mechanism 150 may include processing time, location and/or angle of the detection mechanism 110, image capture intervals, image capture settings, etc. Other inputs are also possible. Finally, the control system may be configured to generate machine inputs for the treatment mechanism 120. That is, translating a farming action of a treatment plan into machine instructions implementable by the treatment mechanism 120.

The control system 130 can be operated by a user operating the farming machine 100, wholly or partially autonomously, operated by a user connected to the farming machine 100 by a network, or any combination of the above. For instance, the control system 130 may be operated by an agricultural manager sitting in a cabin of the farming machine 100, or the control system 130 may be operated by an agricultural manager connected to the control system 130 via a wireless network. In another example, the control system 130 may implement an array of control algorithms, machine vision algorithms, decision algorithms, etc. that allow it to operate autonomously or partially autonomously.

The control system 130 may be implemented by a computer or a system of distributed computers. The computers may be connected in various network environments. For example, the control system 130 may be a series of computers implemented on the farming machine 100 and connected by a local area network. In another example, the control system 130 may be a series of computers implemented on the farming machine 100, in the cloud, a client device and connected by a wireless area network.

The control system 130 can apply one or more computer models to determine and implement farming actions in the field 160. For example, the control system 130 can apply a plant treatment model to images acquired by the detection mechanism 110 to determine and implement farming actions. The control system 130 may be coupled to the farming machine 100 such that an operator (e.g., a driver) can interact with the control system 130. In other embodiments, the control system 130 is physically removed from the farming machine 100 and communicates with system components (e.g., detection mechanism 110, treatment mechanism 120, etc.) wirelessly.

In some configurations, the farming machine 100 may additionally include a communication apparatus, which functions to communicate (e.g., send and/or receive) data between the control system 130 and a set of remote devices.

The communication apparatus can be a Wi-Fi communication system, a cellular communication system, a short-range communication system (e.g., Bluetooth, NFC, etc.), or any other suitable communication system.

Other Machine Components

In various configurations, the farming machine 100 may include any number of additional components.

For instance, the farming machine 100 may include a mounting mechanism 140. The mounting mechanism 140 provides a mounting point for the components of the farming machine 100. That is, the mounting mechanism 140 may be a chassis or frame to which components of the farming machine 100 may be attached but could alternatively be any other suitable mounting mechanism 140. More generally, the mounting mechanism 140 statically retains and mechanically supports the positions of the detection mechanism 110, the treatment mechanism 120, and the verification mechanism 150. In an example configuration, the mounting mechanism 140 extends outward from a body of the farming machine 100 such that the mounting mechanism 140 is approximately perpendicular to the direction of travel 115. In some configurations, the mounting mechanism 140 may include an array of treatment mechanisms 120 positioned laterally along the mounting mechanism 140. In some configurations, the farming machine 100 may not include a mounting mechanism 140, the mounting mechanism 140 may be alternatively positioned, or the mounting mechanism 140 may be incorporated into any other component of the farming machine 100.

The farming machine 100 may include locomoting mechanisms. The locomoting mechanisms may include any number of wheels, continuous treads, articulating legs, or some other locomoting mechanism(s). For instance, the farming machine 100 may include a first set and a second set of coaxial wheels, or a first set and a second set of continuous treads. In the either example, the rotational axis of the first and second set of wheels/treads are approximately parallel. Further, each set is arranged along opposing sides of the farming machine 100. Typically, the locomoting mechanisms are attached to a drive mechanism that causes the locomoting mechanisms to translate the farming machine 100 through the operating environment 102. For instance, the farming machine 100 may include a drive train for rotating wheels or treads. In different configurations, the farming machine 100 may include any other suitable number or combination of locomoting mechanisms and drive mechanisms.

The farming machine 100 may also include one or more coupling mechanisms 142 (e.g., a hitch). The coupling mechanism 142 functions to removably or statically couple various components of the farming machine 100. For example, a coupling mechanism may attach a drive mechanism to a secondary component such that the secondary component is pulled behind the farming machine 100. In another example, a coupling mechanism may couple one or more treatment mechanisms 120 to the farming machine 100.

The farming machine 100 may additionally include a power source, which functions to power the system components, including the detection mechanism 110, control system 130, and treatment mechanism 120. The power source can be mounted to the mounting mechanism 140, can be removably coupled to the mounting mechanism 140, or can be incorporated into another system component (e.g., located on the drive mechanism). The power source can be a rechargeable power source (e.g., a set of rechargeable batteries), an energy harvesting power source (e.g., a solar system), a fuel consuming power source (e.g., a set of fuel cells or an internal combustion system), or any other suitable power source. In other configurations, the power source can be incorporated into any other component of the farming machine 100.

III.B System Environment

FIG. 2 is a block diagram of the system environment for the farming machine 100, in accordance with one or more example embodiments. In this example, the control system 210 (e.g., control system 130) is connected to external systems 220, a machine component array 230, and a client device 243 via a network 240 within the system environment 200.

The external systems 220 are any system that can generate data representing information useful for determining and implementing farming actions in a field. External systems 220 may include one or more sensors 222, one or more processing units 224, and one or more datastores 226. The one or more sensors 222 can measure the field 160, the operating environment 102, the farming machine 100, etc. and generate data representing those measurements. For instance, the sensors 222 may include a rainfall sensor, a wind sensor, heat sensor, a camera, etc. The processing units 2240 may process measured data to provide additional information that may aid in determining and implementing farming actions in the field. For instance, a processing unit 224 may access an image of a field 160 and calculate a weed pressure from the image or may access historical weather information for a field 160 to generate a forecast for the field. Datastores 226 store historical information regarding the farming machine 100, the operating environment 102, the field 160, etc. that may be beneficial in determining and implementing farming actions in the field. For instance, the datastore 226 may store results of previously implemented treatment plans and farming actions for a field 160, a nearby field, and or the region. The historical information may have been obtained from one or more farming machines (i.e., measuring the result of a farming action from a first farming machine with the sensors of a second farming machine). Further, the datastore 226 may store results of specific faming actions in the field 160, or results of farming actions taken in nearby fields having similar characteristics. The datastore 226 may also store historical weather, flooding, field use, planted crops, etc. for the field and the surrounding area. Finally, the datastores 226 may store any information measured by other components in the system environment 200.

The machine component array 230 includes one or more components 232. Components 222 are elements of the farming machine 100 that can take farming actions (e.g., a treatment mechanism 120). As illustrated, each component has one or more input controllers 234 and one or more sensors 236, but a component may include only sensors 236 or only input controllers 234. An input controller 234 controls the function of the component 232. For example, an input controller 234 may receive machine commands via the network 240 and actuate the component 230 in response. A sensor 226 generates data representing measurements of the operating environment 102 and provides that data to other systems and components within the system environment 200. The measurements may be of a component 232, the farming machine 100, the operating environment 102, etc. For example, a sensor 226 may measure a configuration or state of the component 222 (e.g., a setting, parameter, power load, etc.), measure conditions in the operating environment 102 (e.g., moisture, temperature, etc.), capture information representing the operating environment 102 (e.g., images, depth information, distance information), and generate data representing the measurement(s).

The control system 230 receives information from external systems 220 and the machine component array 220 and implements a treatment plan in a field with a farming machine.

The client device 243 is one or more computing devices capable of receiving user input as well as transmitting and/or receiving data via the network 240. In one embodiment, a client device 243 is a conventional computer system, such as a desktop or a laptop computer. Alternatively, a client device 243 may be a device having computer functionality, such as a personal digital assistant (PDA), a mobile telephone, a smartphone, or another suitable device. A client device 243 is configured to communicate via the network 240. In one embodiment, a client device 243 executes an application allowing a user of the client device 243 to interact with the control system 210. For example, a client device 243 executes a browser application to enable interaction between the client device 243 and the control system 210 via the network 240. In another embodiment, a client device 243 interacts with the control system 210 through an application programming interface (API) running on a native operating system of the client device 243, such as IOS® or ANDROID™.

The network 250 connects nodes of the system environment 200 to allow microcontrollers and devices to communicate with each other. In some embodiments, the components are connected within the network as a Controller Area Network (CAN). In this case, within the network each element has an input and output connection, and the network 250 can translate information between the various elements. For example, the network 250 receives input information from the camera array 210 and component array 220, processes the information, and transmits the information to the control system 230. The control system 230 generates a farming action based on the information and transmits instructions to implement the farming action to the appropriate component(s) 222 of the component array 220.

Additionally, the system environment 200 may be other types of network environments and include other networks, or a combination of network environments with several networks. For example, the system environment 200, can be a network such as the Internet, a LAN, a MAN, a WAN, a mobile wired or wireless network, a private network, a virtual private network, a direct communication line, and the like. In some embodiments, the network 240 may comprise any combination of local area and/or wide area networks, using both wired and/or wireless communication systems. In one embodiment, the network 240 uses standard communications technologies and/or protocols.

IV. Personalized Plant Treatment Models

As previously mentioned, a user can have a variety of different preferences or mindsets for performing plant treatment actions in a field depending on any number of factors (note that "plant treatment actions" are example farming actions that may be applied by a farming machine to plants). Example, factors that may affect a user's treatment preferences include the current condition of the plants in the field (e.g., the season, type of crop in the field, types of weeds in the field, and the growth stages or sizes of the crop and weeds in the field); past, present, or predicted weather conditions; economic considerations (e.g., available budget, available time to perform treatment actions, cost of treatment resources (e.g., herbicide, pesticides, and fertilizer)); and changes in the ability to create tailored treatment plans. For example, in some situations a user may desire to treat each individual crop plant and each individual weed plant in a field (e.g., the user has a large budget, and the field includes weeds that will be harmful to the crop plants). However, in other situations, the user may not want to treat each individual plant in the field. For example, if the field includes crop plants in a late growth stage and a small number of weeds in an early growth stage, the user may want to abstain from applying treatments (e.g., herbicide) to the weeds since the weeds will likely die naturally (e.g., by being crowded out) or likely won't affect the crop plants. In another example, the user may be interested in treating weeds larger than a size threshold but not interested in treating weeds smaller than that. In another example, the user may be interested in treating weeds of a first type but not interested in treating weeds of a second type (e.g., the first type will be harmful to crop plants, but the second type will be less harmful to crop plants (All weeds steal nutrients, water, and potentially sun light. However, some weeds have small seedbanks and are not endemic, while other weeds can spread quickly across an entire field if left uncontrolled.)).

Additionally, a user's preferences may change throughout a season (e.g., early, mid, and late season treatment passes following different goals or strategies). For example, a farmer with a large amount of treatment resources during the early season may desire to treat a large number of crop and weed plants in the field. However, in the late season, if the user only has a small amount of treatment resources remaining, the user may desire to treat only a small number of crop and weed plants in the field (e.g., only apply herbicide to large and harmful weeds).

To account for the different and changing preferences of users, some embodiments relate to quantifying these preferences and configuring a farming machine to operate based on these preferences. Among other advantages, some embodiments enable customized plant treatment models or treatment plans for users that result in the desired weed control or resource savings.

Figure 3:
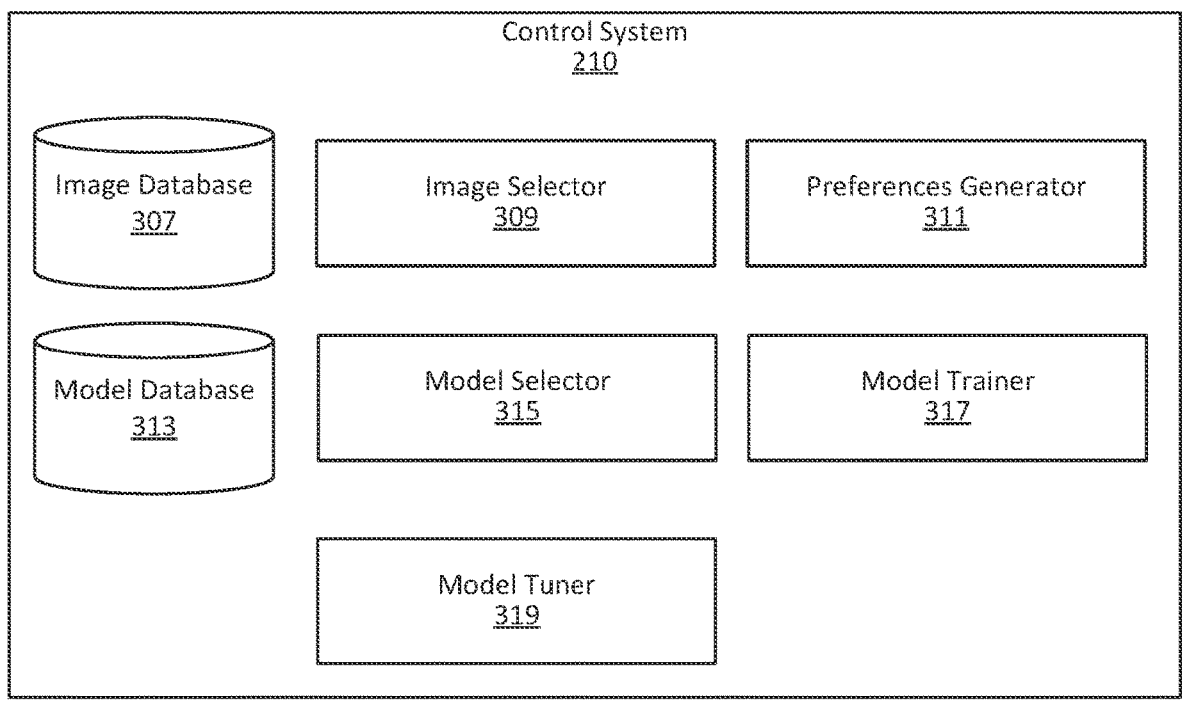
FIG. 3 is a block diagram of a control system, in accordance with one or more example embodiments.

FIG. 3 is a block diagram of a control system 210, in accordance with one or more example embodiments. The control system 210 shown by FIG. 3 includes an image database 307, an image selector module 309, a preferences generator module 311, a model database 313, a model selector module 315, a model trainer module 317, a model tuner module 319, and a configuration module 321. In alternative configurations, different or additional components may be included in the control system 210. Furthermore, one or more of the components in control system 210 may be part of different components or systems. For example, the preferences generator 311 may be on a client device (e.g., 243) or databases 307, 313 may be part of the datastores 226 on the external systems 220.

The image database 307 stores images of plants growing in fields to be presented to a user (which may then be used to determine the user's preferences). The image database 307 may include images of a variety of plant types (e.g., including crop types and weed types) at a variety of growth stages and seasons. As used herein, a plant type may refer to a species or genius of a plant. Images in the image database 307 may be captured by detection mechanisms (e.g., 110) of farming machines (e.g., 100).

The image selector 309 selects a set of images including images of plants with different sizes (e.g., dimensions), types, or some combination thereof to present to a user who intends to treat plants growing in a field (e.g., via farming machine 100). After the images are presented to the user, the user interacts with the images to communicate their preferences. Due to this, it may be desirable for the image selector 309 to select images that include a wide variety of possibilities that may occur in the field to allow the user to accurately communicate their preferences (e.g., images with weeds of a variety of types and sizes). In some embodiments, the image selector 309 receives plant and field information (e.g., provided by the user), such as the crop growing in the field, the current growth stage of the crop, weed types currently growing in the field or expected to grow in the field, and the current season. In these embodiments, the image selector 309 may select images for the set based on this received plant and field information. For example, the image selector 309 selects images that include the crop at the current growth stage, the crop at the current season, weeds of the specified weed types (e.g., at different sizes or growth stages), or some combination thereof. Depending on the embodiment, the image selector 309 may additionally or alternatively select images that include the crop at other growth stages or seasons. After the image selector 309 selects a set of images, the image selector 309 (or another module) provides the set of images to the user (e.g., the set of images are transmitted from the control system 210 to client device 240 via network 240). The number of images in the set of images may depend on the implementation but the number should be large enough to enable the preferences generator 311 to generate one or more plant treatment action preferences of the user (e.g., one or more preferences with a confidence score above a predetermined threshold).

The user can interact with the set of images via the client device 243 (e.g., client device 243 displays one or more images in an interface). For example, the user annotates images by selecting one or more plants in each image and indicating one or more treatment actions that should be applied to the selected plants. Among other advantages, interacting with the images enables the user to express their treatment preferences intuitively and objectively. An example interface that allows a user to interact with a set of images is described with reference to FIG. 4A.

The preferences generator 311 generates one or more plant treatment action preferences of the user for the field. A plant treatment action preference defines a user's goal for treating one or more plants in a field. For example, a plant treatment action preference specifies that weeds in a specific field of at least a threshold size (e.g., dimension) should be treated with a specific herbicide but weeds smaller than that should not be treated (or possibly treated with a different herbicide). In another example, a plant treatment action preference specifies the user's sensitivity to weeds (e.g., all weeds should be treated vs only treating a subset of weeds in the field). In another example, a plant treatment action preference specifies that weed plants (e.g., of a specific type) that are identified with a confidence greater than a threshold (e.g., 80%) should be treated while weeds identified with lesser confidence should not be treated (this may express the user's sensitivity to weeds). In another example, a plant treatment action preference includes a label of a plant in an image that specifies a treatment action that should be applied to that plant.

The preferences generator 311 may generate a plant treatment action preference based on the user's interactions with the set of images (e.g., selected by image selector 309). For example, the preferences generator 311 generates a plant treatment action preference using the user's annotations of the set of images (e.g., the annotations indicate only weeds of a size range should be treated while other weeds shouldn't be treated). In some embodiments, one or more plant treatment action preferences are used to select, train, or tune a plant treatment model. For example, the preferences generator 311 generates labels for the images that the user interacted with and uses the labels to train a plant treatment model. The labels may identify plants in images and treatment actions to be applied to the identified plants. The labels may also include information about the identified plants, such as the plant types or the sizes of the plants.

The model database 313 stores one or more plant treatment models. A plant treatment model may be configured to, responsive to being applied to an image, to identify one or more plants in the image and to identify or determine a corresponding plant treatment action to be applied to the identified one or more plants. In some embodiments, a plant treatment model generates a label for the image that identifies a plant in the image and the corresponding plant treatment action for the plant. A plant treatment model may be a trained model, and a trained plant treatment model may be trained according to one or more of a user's plant treatment action preferences (e.g., via the model trainer 317).

The model database 313 may include different types of models (e.g., classification and regression models), models trained using different training methods (e.g., supervised and unsupervised models), models trained using different training data, or some combination thereof. The strengths and potential weaknesses of the plant treatment models in the model database 313 may be known. For example, plant treatment models in the model database 313 are trained to detect specific plant types (e.g., species or genius) or plants of specific sizes. For example, a first model may detect lambsquarters with a high accuracy while a second model may detect pigweed with high accuracy. In another example, a first model may detect weeds in a first growth stage (or of a first size range) with high accuracy while a second model may detect weeds in a second growth stage (or of a second size range) with high accuracy). In some embodiments, a set of plant treatment models in the model database 313 are configured with different plant detection sensitivity levels (e.g., a first model classifies a group of pixels as a plant if the model has at least a first threshold confidence (e.g., 50%) of the classification while a second model classifies a group of pixels as a weed if the model has at least a second threshold confidence (e.g., 80%). Models in the model database 313 may be used to form one or more ensemble models (the ensemble models may also be stored in the database 313).

The model selector 315 selects a plant treatment model from the model database 313 to be used by a farming machine to treat plants in a field. The model selector 315 may select a model based on one or more plant treatment action preferences of a user (e.g., generated by the preferences generator 311). For example, a selected plant treatment model (a) identifies plants in an image according to a plant detection sensitivity of the user or (b) only identifies plants in an image that are of interest to the user (e.g., weeds of specific types). The model selector 315 may also select a plant treatment model based on a current growth stage of plants growing in the field (e.g., it selects a plant treatment model trained to identify plants at the same growth stage as the plants in the field). In some embodiments, the model selector 315 selects multiple models to be used by a farming machine to treat plants in a field. For example, the model selector 315 selects (1) a first model configured to identify crop plants and the corresponding treatment actions and (2) a second model configured to identify weed plants and the corresponding treatment actions.

In some embodiments, the model selector 315 selects a model by applying plant treatment models to images of plants in a field (e.g., the set of images interacted with by the user) and comparing the outputs with one or more plant treatment action preferences of the user (generated by the preferences generator 311). The model selector 315 may select a plant treatment model with output that is (e.g., most) consistent with the one or more plant treatment action preferences of the user. More specifically, the model selector 315 may compare (1) plants and corresponding plant treatment actions identified by plant treatment models with (2) one or more plant treatment action preferences of the user. The comparison may include determining differences between the output of the plant treatment models and the one or more plant treatment action preferences of the user. The least difference or differences below a threshold difference may be the basis for selecting a plant treatment model. In some embodiments, (1) plant treatment action preferences of the user include image labels and (2) plant treatment models generate image labels. In these embodiments, the model selector 315 may selected a plant treatment model by comparing the labels generated by each model may be with the image labels of the user's one or more plant treatment action preferences.

The model trainer 317 can train a plant treatment model. The model trainer 317 may train a plant treatment model based on one or more plant treatment action preferences of a user. In other words, the model trainer 317 can create a customized plant treatment model based on one or more plant treatment action preferences of a user. For example, the model trainer 317 trains a plant treatment model to (a) identify plants in an image according to a plant detection sensitivity of a user or (b) only identify plants in an image that are of interest to the user (e.g., weeds of specific types). To provide a more specific example, based on plant size preferences of a user, the model trainer 317 may train a plant detection model to identify plants (e.g., weeds) with sizes in a first size range and ignore plants with sizes outside that size range. As previously described, if one or more plant treatment action preferences of a user include labels for a set of images, the model trainer 317 may train a plant treatment model using the set of images and the labels (as previously described a label may identify a plant in an image, a treatment action to be applied to the plant, and information about the plant, such as the plant type). In some embodiments, a plant treatment model includes parameters with default values, and training the plant treatment model comprises changing values of the parameters based on a plant treatment action preference of a user. Training a plant treatment model is further described with respect to FIG. 5. After a model is trained, it may be stored in the model database 313.

The model tuner 319 tunes a trained plant treatment model based on user feedback or tuning instructions. In some embodiments, the model tuner 319 allows a user to provide real-time feedback or tuning instructions when the plant treatment model is being used by a farming machine. For example, while a farming machine is operating in a field and using a trained plant treatment model, a user can view which plants are receiving plant treatment actions and provide feedback (e.g., "treat fewer weeds"). An updated plant treatment action preference of the user may be generated in response to this feedback (e.g., by preferences generator 311). The model tuner 319 receives user feedback (e.g., one or more updated plant treatment actions preferences) or tuning instructions and can tune the plant treatment model accordingly, resulting in the farming machine operating differently. For example, the model tuner 319 adjusts parameters of the plant treatment model. Example adjustments may result in the plant treatment model identifying more or fewer plants; identifying different plant types; identifying larger or smaller plants; determining more, fewer, or different plant treatment actions; or some combination thereof. A user may provide tuning instructions using a sensitivity knob (e.g., a physical knob or a knob displayed in a digital user interface). In some embodiments, the knob includes relative symbols, such as "+" or "−", instead of objective symbols. Among other advantages, this reduces any negative effects that tuning the plant treatment model could drive, even after calibration of such model.

After a plant treatment model is ready for implementation (e.g., selected by the model selector 315 from the model database 313 or trained by the model trainer 317), the control system 210 may configure a farming machine (e.g., 100) to operate based on the plant treatment model. For example, the control system 210 may provide images captured by a detection mechanism (e.g., 110) to the plant treatment model and provide instructions to a treatment mechanism (e.g., 120) in accordance with the plant treatment actions determined by a plant treatment model. As previously suggested, the control system 120 may configure a farming machine to operated based on multiple selected plant treatment models. For example, the control system operates according to first and second treatment models, where the first treatment model is trained to identify crop plants and determine corresponding plant treatment actions and the second treatment model is trained to identify weed plants and corresponding plant treatment actions (where both the first and second model are selected or trained according to the preferences of a user).

IV.A User Interface

Figure 4A:
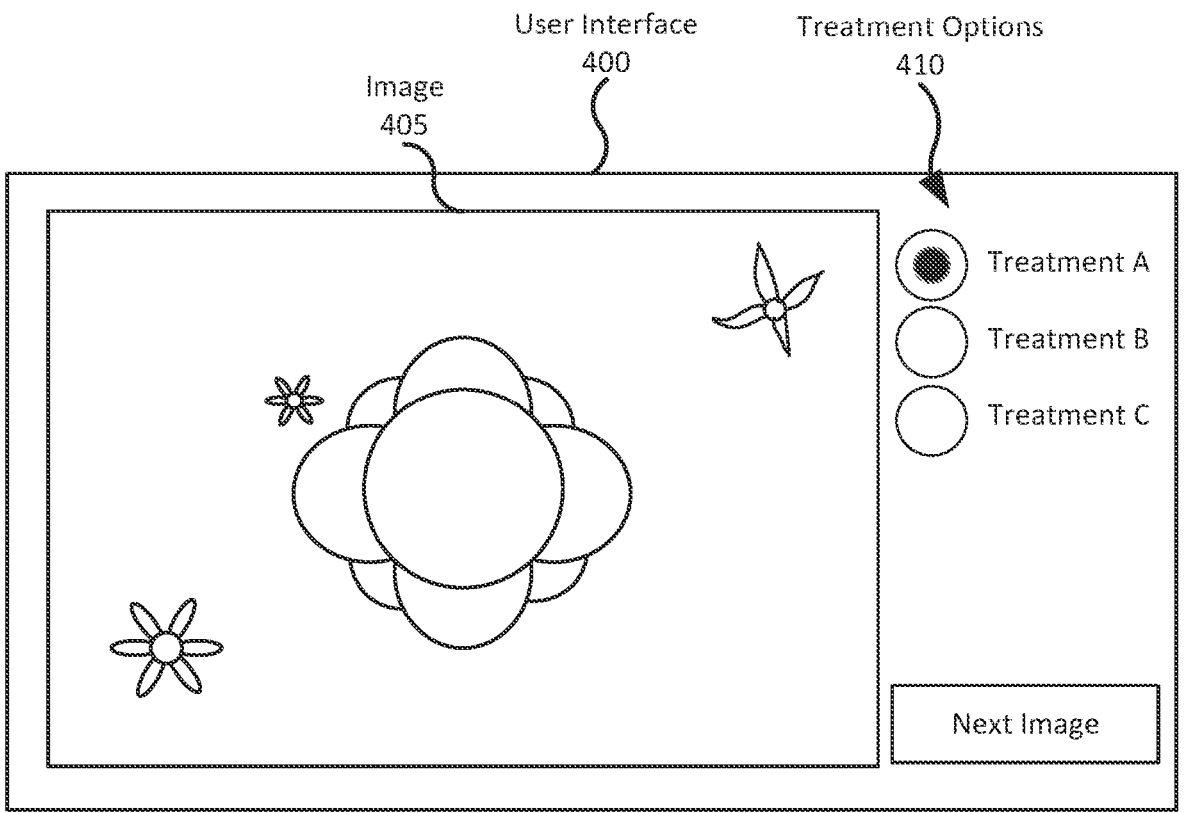
FIG. 4A is a diagram of a user interface that may be displayed to a user, in accordance with one or more example embodiments.

FIG. 4A is a user interface 400 that may be displayed to a user (e.g., via client device 243), according to one or more embodiments. The interface 400 includes an image 405 of plants in a field and selectable treatment options 410. The interface 400 allows a user to interact with images selected by image selector 309 to communicate their plant treatment preferences. For example, the user can select a treatment option 410 (e.g., treatment A) and then select one or more plants in the image that should receive the selected treatment. After the user is done interacting with image 405, they may select the button labeled "Next Image" to view and interact with another image. Although not illustrated in FIG. 4A, the interface may include additional interface items (e.g., buttons) that allow a user to explicitly communicate their preferences. Thus, instead of selecting individual plants and their corresponding treatments, a user may be able to select buttons labeled, for example, "Max Weed Control," "Max Savings," or "Escapes Only," where "Max Weed Control" indicates the user desires to treat as many weeds as reasonably possible, "Max Savings" indicates the user desires to save resources (e.g., herbicides) by treating as few weeds as reasonably possible, and "Escapes Only" indicates the user desires to only treat weeds breaking through a canopy of the crop.

Figure 4B:
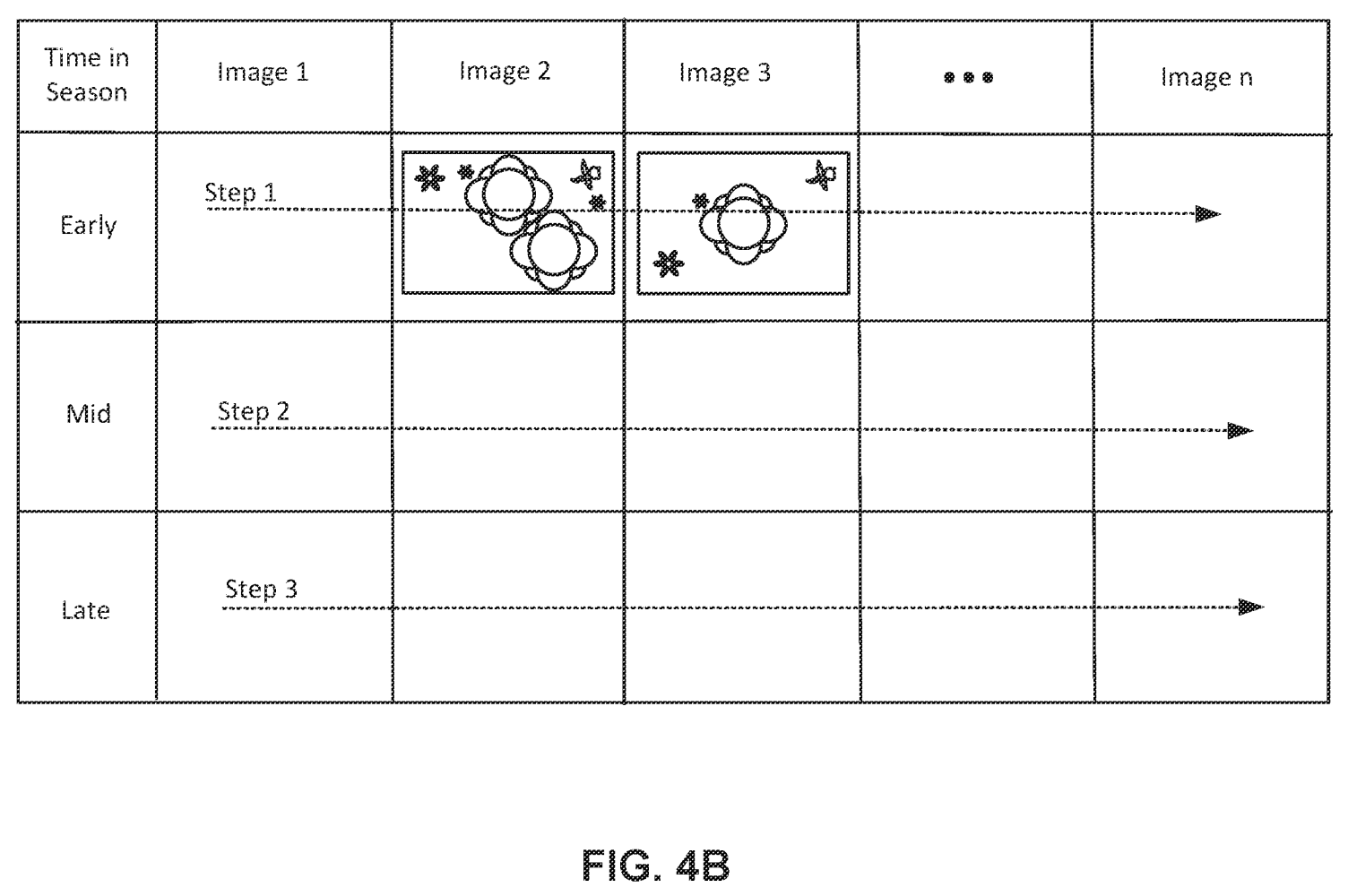

FIG. 4B a conceptual flowchart for an interface (e.g., 400) presenting images to a user, according to one or more embodiments. As indicated, at step 1, images 1 through n are presented to a user, where these images include crop plants at an early season (e.g., the crop plants have recently broken through the soil surface) and weed plants. Note that only images 2 and 3 of step 1 are illustrated in FIG. 4B. At step 2, new images 1 through n are presented to the user, where these images include crop plants at mid-season and weed plants. At step 3, new images 1 through n are presented to the user, where these images include crop plants at late season and weeds. At each step, the images may be presented sequentially to the user and the user may interact with each image (e.g., indicating which weed the user would want treated and indicating which weeds the user would want ignored). Among other advantages, presenting images at different seasons (or stages in seasons) allows the user to communicate different preferences for different seasons (e.g., ignore small weeds in the early season, treat all weeds in mid-season, and treat only large weeds in late season). However, in other embodiments, images of crop plants during more or fewer seasons may presented. For example, only images of a single season (e.g., the current season) are presented and the process is repeated at periodic times (e.g., along a seasonal timeline or prior to an upcoming season).

In some embodiments, an interface (e.g., the interface in FIG. 4A or 4B) presents a user with the option so view or interact with additional resources for plan optimization. For example, an interface presents the user with the option to via the latest recommendations from a (e.g., university) study on how to control a weed type (e.g., pigweed).

IV.B Training a Plant Treatment Model

FIG. 5 illustrates a method of training a plant treatment model, in accordance with one or more embodiments. The method 500 may be performed from the perspective of the model trainer 317. The method 500 can include greater or fewer steps than described herein. Additionally, the steps can be performed in different order, or by different components than described herein.

The model trainer 317 accesses 510 a set of images with pixels representing one or more plants. The images have a field of view from an image sensor. The image sensor may be attached to a farming machine (e.g., 100) as the farming machine travels past plants in a field. The model trainer 317 identifies 520 a plurality of pixel groups within the images. Each pixel group represents one or more plants and indicates a representative location in the image of the one or more plants. In some embodiments, the images are a set of images that a user interacted with, and the one or more plant treatment action preferences of the user identify the plurality of pixel groups in the set of images.

For each image in the set of images, the model trainer 317 (or the preferences generator 311) generates 530 one or more labelled images by assigning a label to each of the pixel groups in the image (as previously described a label may identify a plant in an image, a treatment action to be applied to the plant, and information about the plant, such as the plant type). For example, bounding box labels are placed around the pixel groups and plant information is assigned to the box labels. In another example (e.g., for a pixel segmentation model), individual pixels in the pixel groups are identified and assigned to labels. To label the images, the model trainer 317 (or the preferences generator 311) may receive input from one or more users who view the images and identify plants in the bounding boxes. For example, an agronomically trained user identifies a species of each plant represented by a pixel group in a bounding box. In some embodiments, the labelled images include labels for groups of pixels representing non-plant objects in the field, such as the soil, rocks, field debris, etc. For example, these non-plant objects are labelled by assigning "non-plant object" to the pixels representing them.

The model trainer 317 trains 540 the plant treatment model to determine (e.g., identify) a plant and determine a plant location in a single image using the set of labelled images. The model trainer 317 may also train the plant treatment model to determine a plant treatment action for the plant. The plant treatment model is trained by associating the images with the labelled images. For example, functions of a neural network are trained to associate a label of a labeled image with a group of pixels in a corresponding unlabeled image.

In some cases, if a user's plant treatment action preferences prioritize identification of one plant type over another, the plant treatment model may be instructed to deliver higher performance with respect to a certain metric for a specific plant type. For example, when using a semantic segmentation plant treatment model that classifies pixels in an image as either "pigweed," "weed other than pigweed," and "not a weed," a user may want to prioritize recall for "pigweed" relative to recall for "weed other than pigweed" and recall for "not a weed." In this example, the plant treatment model may be trained with a loss function such as asymmetric loss, and use parameters that prioritize recall for "pigweed," such as by using a higher beta value for "pigweed" than for "weed other than pigweed" and "not a weed." In some embodiments, it may be important to a user to identify noxious weed species. In these embodiments, the loss function may be adjusted to penalize identification mistakes on noxious weeds more heavily than less noxious or non-noxious weeds. Thus, the plant treatment model may be tuned to perform more accurately on noxious weeds, which may reduce the change that noxious weeds will compete with the crop.

The model trainer 317 can train the plant treatment model periodically during operation of a farming machine, at a determined time, or before the plant treatment model is implemented on a farming machine.

IV.C Example Methods

Method for Selecting and Utilizing a Plant Treatment Model

FIG. 6 is a flowchart of an example method for selecting and utilizing a plant treatment model, in accordance with one or more embodiments. The method 600 may be performed from the perspective of the control system 210. The method 600 can include greater or fewer steps than described herein. Additionally, the steps can be performed in different order, or by different components than described herein.

At step 610, the control system 210 provides images of plants of different dimensions and types for display to a user (e.g., the images are selected by the image selector 309 from the image database 307). The images may include crop plants in the same growth stage (relative to each other) and weed plants in different growth stages (relative to each other).

At step 620, the control system 210 (e.g., via the preferences generator 311) generates one or more plant treatment action preferences of the user for a farming machine configured to perform treatment actions on plants growing in a field. The one or more plant treatment action preferences are generated based on interactions by the user with the provided images of plants. The interactions by the user may include the user manually annotating one or more of the provided images (e.g., the user interacts with a touch screen of a client device).

At step 630, the control system 210 applies (e.g., via the model selector 315) a plurality of trained plant treatment models to the images of plants. Each trained plant treatment model identifies one or more plants in the images and one or more corresponding plant treatment actions. The trained plant treatment models may be trained to identify plants of specific types or sizes (e.g., dimensions). The trained plant treatment models may be models with different plant identification sensitivity levels.

At step 640, the control system 210 selects (e.g., via the model selector 315) the plant treatment model from the plurality of trained plant treatment models based on a comparison of (1) plants and corresponding plant treatment actions identified by the plurality of plant treatment models in the images and (2) the one or more plant treatment action preferences of the user. Selecting the plant treatment model may be based on a current growth stage of plant crops growing in the field. The comparison may include determining differences between (1) plants and corresponding plant treatment actions identified by the plurality of plant treatment models and (2) the one or more plant treatment action preferences of the user. The differences between (1) the plants and corresponding plant treatment actions identified by the selected plant treatment model and (2) the one or more plant treatment action preferences of the user may be at least one of: (a) less than a threshold difference or (b) smaller than the differences between (1) plants and corresponding plant treatment actions identified by the other (remaining) plant treatment models and (2) the one or more plant treatment action preferences of the user.

At step 650, the control system 210 configures the farming machine to operate based on the selected plant treatment model.

In some embodiments, method 600 further includes adjusting (e.g., via the model tuner 319) parameters of the selected plant treatment model based on the one or more plant treatment action preferences of the user. While the farming machine is operating, the control system 210 may provide indications of plant treatment actions performed by the farming machine to the user. The control system 210 may generate one or more updated plant treatment action preferences based on the interactions by the user with the indications. The control system 210 may adjust parameters of the selected plant treatment model based on the updated plant treatment action preferences.

Method for Training a Plant Treatment Model

FIG. 7 is a flowchart of an example method for training a plant treatment model, in accordance with one or more embodiments. The method 700 may be performed from the perspective of the control system 210. The method 700 can include greater or fewer steps than described herein. Additionally, the steps can be performed in different order, or by different components than described herein.

At step 710, the control system 210 provides images of plants of different sizes and types for display to and annotation by a user (e.g., the images are selected by the image selector 309 from the image database 307).

At step 720, the control system 210 receives or generates one or more plant treatment action preferences of the user for a farming machine configured to perform treatment actions on plants growing in a field (e.g., the plant treatment action preferences are generated by the preferences generator 311 and received by the model trainer 317). The one or more plant treatment action preferences include labels for the images that identify plants in the images and treatment actions to be applied to the identified plants. The labels may be generated responsive to the user annotating the provided images and based on the annotations.

At step 730, the control system 210 trains (e.g., via the model trainer 317) the plant treatment model based on the one or more plant treatment action preferences of the user. The trained plant treatment model is configured to, when applied to an image of one or more plants in the field, determine treatment actions to be applied to the one or more plants in accordance with the one or more plant treatment action preferences of the user. The trained plant treatment model may be configured to, when applied to an image of multiple plants, identify a subset of the multiple plants in the image in accordance with the one or more plant treatment action preferences of the user. Identifying the subset of plants in the image may include identifying weed plants with sizes in a size range in the image and ignoring weed plants with sizes outside the size range. In some embodiments, a plant identification sensitivity level of the trained plant treatment model is based on the one or more plant treatment action preferences of the user. In some embodiments, the (untrained) plant treatment model includes parameters with default values, and training the plant treatment model comprises changing values of the parameters based on the labels for the images.

At step 740, the control system 210 configures the farming machine to operate based on the trained plant treatment model.

In some embodiments, method 700 further includes the control system 210 receiving or generating one or more revised plant treatment action preferences of the user; and adjusting (e.g., via the model tuner 319) parameters of the trained plant treatment model based on the one or more revised plant treatment action preferences. The one or more revised plant treatment action preferences of the user may be received subsequent to the user receiving indications of plant treatment actions performed by the farming machine while operating based on the trained plant treatment model. Adjusting the parameters of the trained plant treatment model may be is performed while the farming machine is operating in the field.

Although the disclosure above describes plant treatment models identifying plants and determining plant treatment actions to be performed by a farming machine, the disclosure should not be limited to these descriptions. For example, a treatment model may be configured to identify objects other than plants and determine treatment actions to be performed by a machine to objects other than plants (e.g., the soil) or based on objects other than plants. For example, a treatment model is configured to identify residue (plant material left on the ground from a previous harvest pass) and determine treatment actions to be performed to the residue or based on the residue.

V. Control System

Figure 8:
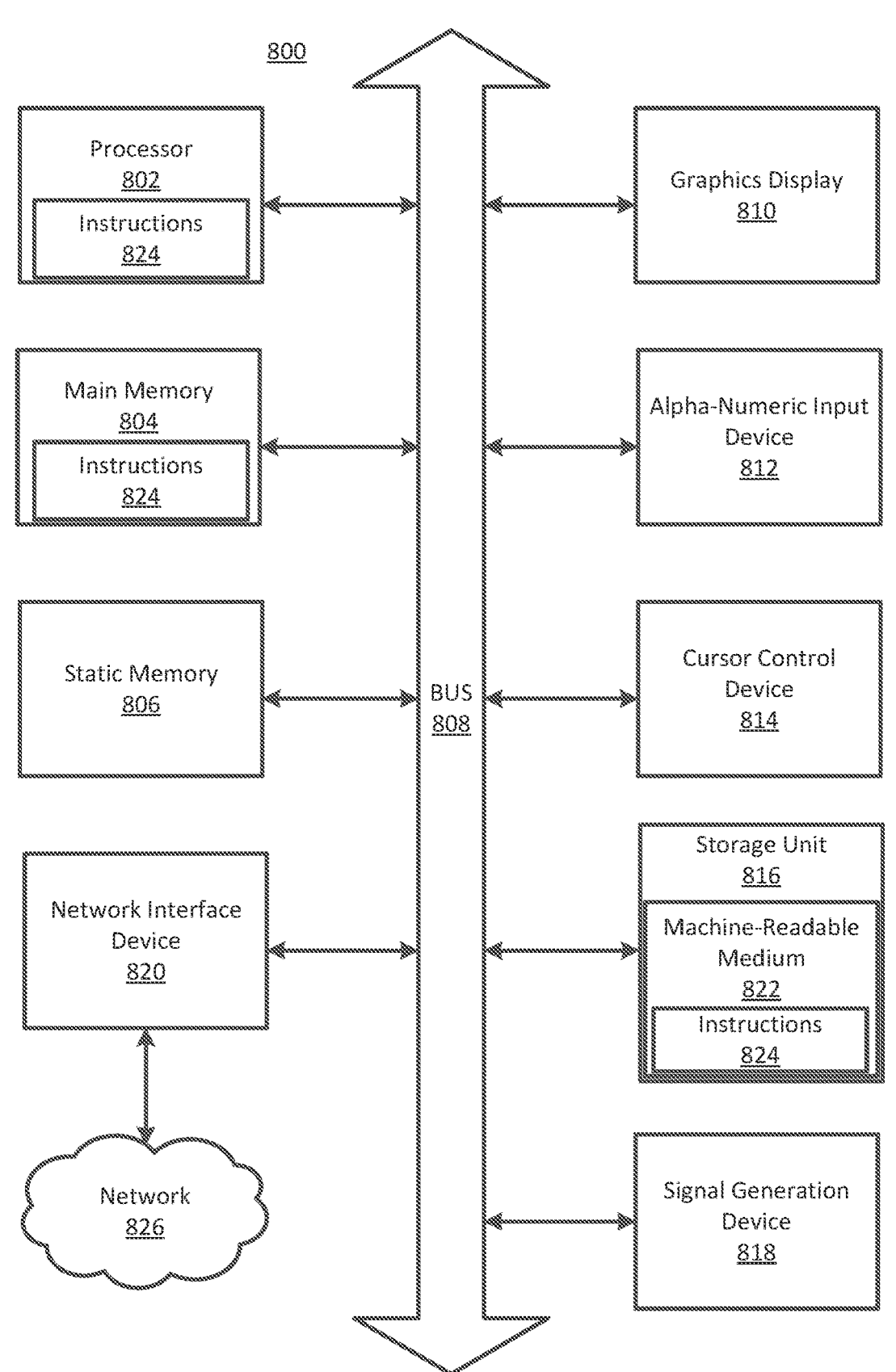
FIG. 8 is a block diagram illustrating components of an example machine for reading and executing instructions from a machine-readable medium, in accordance with one or more example embodiments.

FIG. 8 is a block diagram illustrating components of an example machine for reading and executing instructions from a machine-readable medium. Specifically, FIG. 8 shows a diagrammatic representation of control system 130 or 210 in the example form of a computer system 800. The computer system 800 can be used to execute instructions 824 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 824 (sequential or otherwise) that specify actions to be taken by that machine. Further, while only a single machine is illustrated, the term "machine" shall also be taken to include any collection of machines that individually or jointly execute instructions 824 to perform any one or more of the methodologies discussed herein.

The example computer system 800 includes one or more processing units (generally processor 802). The processor 802 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 800 also includes a main memory 804. The computer system may include a storage unit 816. The processor 802, memory 804, and the storage unit 816 communicate via a bus 808.

In addition, the computer system 800 can include a static memory 806, a graphics display 810 (e.g., to drive a plasma display panel (PDP), a liquid crystal display (LCD), or a projector). The computer system 800 may also include alphanumeric input device 812 (e.g., a keyboard), a cursor control device 814 (e.g., a mouse, a trackball, a joystick, a motion sensor, or other pointing instrument), a signal generation device 818 (e.g., a speaker), and a network interface device 820, which also are configured to communicate via the bus 808.

The storage unit 816 includes a machine-readable medium 822 on which is stored instructions 824 (e.g., software) embodying any one or more of the methodologies or functions described herein. For example, the instructions 824 may include the functionalities of modules of the system 130 described in FIGS. 2-3. The instructions 824 may also reside, completely or at least partially, within the main memory 804 or within the processor 802 (e.g., within a processor's cache memory) during execution thereof by the computer system 800, the main memory 804 and the processor 802 also constituting machine-readable media. The instructions 824 may be transmitted or received over a network 826 (e.g., network 220) via the network interface device 820.

VI. Additional Considerations

In the description above, for purposes of explanation, numerous specific details are set forth in order to provide a thorough understanding of the illustrated system and its operations. It will be apparent, however, to one skilled in the art that the system can be operated without these specific details. In other instances, structures and devices are shown in block diagram form in order to avoid obscuring the system.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Some portions of the detailed descriptions are presented in terms of algorithms or models and symbolic representations of operations on data bits within a computer memory. An algorithm is here, and generally, conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. Furthermore, it has also proven convenient at times, to refer to arrangements of operations as modules, without loss of generality. The described operations and their associated modules may be embodied in software, firmware, hardware, or any combinations thereof.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Some of the operations described herein are performed by a computer (e.g., physically mounted within a machine 100). This computer may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of non-transitory computer readable storage medium suitable for storing electronic instructions.

The figures and the description above relate to various embodiments by way of illustration only. It should be noted that from the following discussion, alternative embodiments of the structures and methods disclosed herein will be readily recognized as viable alternatives that may be employed without departing from the principles of what is claimed.

One or more embodiments have been described above, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Some embodiments may be described using the expression "coupled" and "connected" along with their derivatives.

It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct physical or electrical contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article or apparatus that comprises a list of elements is not necessarily limited to only those elements but may include other elements not expressly listed or inherent to such process, method, article or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

In addition, use of "a" or "an" are employed to describe elements and components of the embodiments herein. This is done merely for convenience and to give a general sense of the system. This description should be read to include one or at least one and the singular also includes the plural unless it is obvious that it is meant otherwise.

Upon reading this disclosure, those of skill in the art will appreciate still additional alternative structural and functional designs. Thus, while particular embodiments and applications have been illustrated and described, it is to be understood that the disclosed embodiments are not limited to the precise construction and components disclosed herein. Various modifications, changes and variations, which will be apparent to those, skilled in the art, may be made in the arrangement, operation and details of the method and apparatus disclosed herein without departing from the spirit and scope defined in the appended claims.

What is claimed is:

1. A method for selecting a plant treatment model to be used by a farming machine configured to perform treatment actions on plants growing in a field, the method comprising:

providing images of plants of different dimensions and types for display to a user;

generating one or more plant treatment action preferences of the user for the farming machine based on interactions by the user with the provided images of plants;

applying a plurality of trained plant treatment models to the images of plants, each trained plant treatment model identifying one or more plants in the images and one or more corresponding plant treatment actions to be applied to the identified one or more plants;

selecting the plant treatment model from the plurality of trained plant treatment models to be used by the farming machine to perform treatment actions on plants in the field, the plant treatment model selected based on a comparison of (1) plants and corresponding plant treatment actions identified by the plurality of trained plant treatment models in the images and (2) the one or more plant treatment action preferences of the user; and configuring the farming machine to perform treatment actions on plants in the field using the plant treatment model selected from the plurality of trained plant treatment models.

2. The method of claim 1, further comprising: adjusting parameters of the selected plant treatment model based on the one or more plant treatment action preferences of the user.

3. The method of claim 1, further comprising:
    while the farming machine is operating in the field;
        providing indications of plant treatment actions performed by the farming machine to the user;
        generating one or more updated plant treatment action preferences based on the interactions by the user with the indications; and
        adjusting parameters of the selected plant treatment model based on the updated plant treatment action preferences.

4. The method of claim 1, wherein the plurality of trained plant treatment models includes trained plant treatment models trained to identify plants of specific types or dimensions.

5. The method of claim 1, wherein the plurality of trained plant treatment models includes trained plant treatment models with different plant identification sensitivity levels.

6. The method of claim 1, wherein selecting the plant treatment model from the plurality of trained plant treatment models is further based on a current growth stage of plant crops growing in the field.

7. The method of claim 1, wherein the images include crop plants in a same growth stage and weed plants in different growth stages.

8. The method of claim 1, wherein the comparison includes determining differences between (1) plants and corresponding plant treatment actions identified by the plurality of trained plant treatment models and (2) the one or more plant treatment action preferences of the user.

9. The method of claim 8, wherein differences between (1) the plants and corresponding plant treatment actions identified by the selected plant treatment model and (2) the one or more plant treatment action preferences of the user are at least one of: (a) less than a threshold difference or (b) smaller than the differences between (1) plants and corresponding plant treatment actions identified by the other plant treatment models and (2) the one or more plant treatment action preferences of the user.

10. The method of claim 1, wherein the interactions by the user with the provided images of plants include the user manually annotating one or more of the provided images.

11. A non-transitory computer-readable storage medium comprising stored instructions that, when executed by a computing device, cause the computing device to perform operations including:
    providing images of plants of different dimensions and types for display to a user;
    generating one or more plant treatment action preferences of the user for a farming machine based on interactions by the user with the provided images of plants;
    applying a plurality of trained plant treatment models to the images of plants, each trained plant treatment model identifying one or more plants in the images and one or more corresponding plant treatment actions to be applied to the identified one or more plants;
    selecting a plant treatment model from the plurality of trained plant treatment models to be used by the farming machine to perform treatment actions on plants in a field, the plant treatment model selected based on a comparison of (1) plants and corresponding plant treatment actions identified by the plurality of trained plant treatment models in the images and (2) the one or more plant treatment action preferences of the user; and
configuring the farming machine to perform treatment actions on plants in the field using the selected plant treatment model selected from the plurality of trained plant treatment models.

12. The non-transitory computer-readable storage medium of claim 11, further comprising: adjusting parameters of the selected plant treatment model based on the one or more plant treatment action preferences of the user.

13. The non-transitory computer-readable storage medium of claim 11, further comprising:
    while the farming machine is operating in the field;
        providing indications of plant treatment actions performed by the farming machine to the user;
        generating one or more updated plant treatment action preferences based on the interactions by the user with the indications; and
        adjusting parameters of the selected plant treatment model based on the updated plant treatment action preferences.

14. The non-transitory computer-readable storage medium of claim 11, wherein the plurality of trained plant treatment models includes trained plant treatment models trained to identify plants of specific types or dimensions.

15. The non-transitory computer-readable storage medium of claim 11, wherein the plurality of trained plant treatment models includes trained plant treatment models with different plant identification sensitivity levels.

16. The non-transitory computer-readable storage medium of claim 11, wherein selecting the plant treatment model from the plurality of trained plant treatment models is further based on a current growth stage of plant crops growing in the field.

17. The non-transitory computer-readable storage medium of claim 11, wherein the images include crop plants in a same growth stage and weed plants in different growth stages.

18. The non-transitory computer-readable storage medium of claim 11, wherein the comparison includes determining differences between (1) plants and corresponding plant treatment actions identified by the plurality of trained plant treatment models and (2) the one or more plant treatment action preferences of the user.

19. The non-transitory computer-readable storage medium of claim 18, wherein differences between (1) the plants and corresponding plant treatment actions identified by the selected plant treatment model and (2) the one or more plant treatment action preferences of the user are at least one of: (a) less than a threshold difference or (b) smaller than the differences between (1) plants and corresponding plant treatment actions identified by the other plant treatment models and (2) the one or more plant treatment action preferences of the user.

20. The non-transitory computer-readable storage medium of claim 11, wherein the interactions by the user with the provided images of plants include the user manually annotating one or more of the provided images.

21. The method of claim 1, wherein the images of plants are not images of plants in the field.

22. The method of claim 1, wherein the providing the images of plants, the generating one or more plant treatment action preferences of the user, the applying the plurality of trained plant treatment models to the images of plants, and the selecting the plant treatment model from the plurality of trained plant treatment models are performed prior to the farming machine performing treatment actions on plants growing in the field.

23. The method of claim 1, further comprising:

subsequent to configuring the farming machine to perform treatment actions on plants in the field using the plant treatment model selected from the plurality of trained plant treatment models, performing, by the farming machine, treatment actions on plants growing in the field using the plant treatment model selected from the plurality of trained plant treatment models.

<center>* * * * *</center>